(12) United States Patent
Swager et al.

(10) Patent No.: US 8,426,208 B2
(45) Date of Patent: Apr. 23, 2013

(54) METHOD AND APPARATUS FOR DETERMINING RADIATION

(75) Inventors: Timothy M. Swager, Newton, MA (US); Jose M. Lobez, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/454,519

(22) Filed: Apr. 24, 2012

(65) Prior Publication Data

US 2012/0295360 A1 Nov. 22, 2012

Related U.S. Application Data

(63) Continuation of application No. 12/899,201, filed on Oct. 6, 2010, now Pat. No. 8,187,887.

(60) Provisional application No. 61/249,042, filed on Oct. 6, 2009.

(51) Int. Cl.
*G01N 23/00* (2006.01)

(52) U.S. Cl.
USPC ........ 436/58; 436/57; 422/82.02; 250/370.07

(58) Field of Classification Search .............. 250/370.07
See application file for complete search history.

(56) References Cited

U.S. PATENT DOCUMENTS

| 3,450,878 | A | | 6/1969 | Pezdirtz et al. |
| 3,915,706 | A | * | 10/1975 | Limburg et al. ............. 430/290 |
| 4,616,237 | A | * | 10/1986 | Pettigrew et al. ......... 346/135.1 |
| 5,753,088 | A | | 5/1998 | Olk |
| 6,616,497 | B1 | | 9/2003 | Choi et al. |
| 6,652,958 | B2 | | 11/2003 | Tobita |
| 6,705,910 | B2 | | 3/2004 | Sheu et al. |
| 6,902,658 | B2 | | 6/2005 | Talin et al. |
| 7,014,743 | B2 | | 3/2006 | Zhou et al. |
| 7,187,115 | B2 | | 3/2007 | Seon |
| 7,365,100 | B2 | | 4/2008 | Kuper et al. |
| 7,871,533 | B1 | | 1/2011 | Haiping et al. |
| 8,187,887 | B2 | | 5/2012 | Swager et al. |

(Continued)

FOREIGN PATENT DOCUMENTS

| CN | 1995143 A | 7/2007 |
| JP | 63-221278 A | 9/1988 |

(Continued)

OTHER PUBLICATIONS

Kubat, P., et al Degradation of pyrene by UV radiation, 2000, Journal of photochemistry and photobiology A: Chemistry, vol. 132, pp. 33-36.*

(Continued)

*Primary Examiner* — Yelena G Gakh
*Assistant Examiner* — Robert Xu
(74) *Attorney, Agent, or Firm* — Wolf, Greenfield & Sacks, P.C.

(57) ABSTRACT

The present invention relates to devices, systems, and methods for determination of ionizing radiation. In some embodiments, the devices comprise nanocomposite materials containing nanostructures (e.g., carbon nanotubes) dispersed in radiation sensitive polymers. In some cases, the device may include a conductive pathway that may be affected upon exposure to ionizing radiation. Embodiments described herein may provide inexpensive, large area, low power, and highly sensitive radiation detection materials/devices.

32 Claims, 15 Drawing Sheets

U.S. PATENT DOCUMENTS

| | | |
|---|---|---|
| 8,212,132 B2 | 7/2012 | Swager et al. |
| 2002/0037457 A1 | 3/2002 | Choi |
| 2006/0057927 A1 | 3/2006 | Kang et al. |
| 2006/0063464 A1 | 3/2006 | Kang et al. |
| 2006/0202168 A1 | 9/2006 | Barrera et al. |
| 2008/0076816 A1 | 3/2008 | Bianco et al. |
| 2008/0131658 A1 | 6/2008 | Wakharkar et al. |
| 2008/0221240 A1 | 9/2008 | Swager et al. |
| 2009/0058258 A1 | 3/2009 | Chang et al. |
| 2010/0179054 A1 | 7/2010 | Swager et al. |
| 2010/0222432 A1 | 9/2010 | Hua |
| 2011/0081724 A1 | 4/2011 | Swager et al. |
| 2011/0089051 A1 | 4/2011 | Wang et al. |
| 2011/0171629 A1 | 7/2011 | Swager et al. |
| 2012/0116094 A1 | 5/2012 | Swager et al. |
| 2012/0171093 A1 | 7/2012 | Swager et al. |

FOREIGN PATENT DOCUMENTS

| | | |
|---|---|---|
| JP | 2008-047855 A | 2/2008 |
| WO | WO 01/10779 A1 | 2/2001 |
| WO | WO 2004/113275 A2 | 12/2004 |
| WO | WO 2006/104046 A1 | 10/2006 |
| WO | WO 2006/115486 A1 | 11/2006 |
| WO | WO 2007/033189 A1 | 3/2007 |
| WO | WO 2007/098578 A1 | 9/2007 |
| WO | WO 2007/143028 A2 | 12/2007 |
| WO | WO 2008/133779 A2 | 11/2008 |
| WO | WO 2009/136978 A2 | 11/2009 |

OTHER PUBLICATIONS

International Search Report and Written Opinion for PCT/US2008/003180 mailed Jun. 19, 2009.
International Preliminary Report on Patentability for PCT/US2008/003180 mailed Sep. 17, 2009.
Invitation to Pay Additional Fees for PCT/US2009/001396 mailed Dec. 10, 2009.
International Search Report and Written Opinion for PCT/US2009/001396 mailed Apr. 22, 2010.
International Preliminary Report on Patentability for PCT/US2009/001396 mailed Sep. 16, 2010.
International Search Report and Written Opinion for PCT/US2009/006512 mailed Oct. 22, 2010.
International Preliminary Report on Patentability for PCT/US2009/006512 mailed Jun. 23, 2011.
Invitation to Pay Additional Fees for PCT/US2010/051610 mailed Dec. 27, 2011.
International Search Report and Written Opinion for PCT/US2010/051610 mailed Mar. 5, 2012.
Invitation to Pay Additional Fees for PCT/US2010/055395 mailed Dec. 7, 2011.
[No Author Listed] TGP- H Carbon Fiber Paper. Toray Automotive Solutions. Toray Industries (America), Inc. Available at http://www.toray-auto.us/poductrs/carbon_papers_fuel_cells.html. Last accessed Nov. 19, 2010. 2 pages.
Albert et al., Cross-reactive chemical sensor arrays. Chem Rev. Jul. 12, 2000;100(7):2595-626.
Bai et al., Gas Sensors Based on Conducting Polymers. Sensors. 2007;7:267-307.
Baughman et al., Carbon Nanotubes—The Route Toward Applications. Science. 2002;297(2):787-92.
Becker et al., The Influence of Surface Strain on the Chemical Reactivity of Fullerene Ions: Addition Reactions with Cyclopentadiene and 1,3-cycolhexadiene. International Journal of Mass Spectrometry and Ion Processes. 1997;167/168:519-24.
Chen et al., Dissolution of Full-Length Single-Walled Carbon Nanotubes. J Phys Chem B. 2001;105:2525-28.
Chen et al., Noncovalent functionalization of carbon nanotubes for highly specific electronic biosensors. Proc Natl Acad Sci U S A. Apr. 29, 2003;100(9):4984-9. Epub Apr. 15, 2003.
Coffey et al., Conducting Polymer/Graphite Fiber Composites for High Charge Density Battery Electrodes. Lithium batteries—Symposium. Proceedings—Electrochemical Society. New Orleans, LA. Oct. 1993. The Society. 1994;94-4:258-68.
Coffey et al., High charge density conducting polymer/graphite fiber composite electrodes for battery applications. J Electrochem Soc. 1995;142(2):321-25.
Collins et al., Extreme oxygen sensitivity of electronic properties of carbon nanotubes. Science. Mar. 10, 2000;287(5459):1801-4.
Diederich et al., Covalent Fulleren Chemistry. Science. 1996;271:317-23.
Dwyer et al., DNA-functionalized single-walled carbon nanotubes. Nanotechnology. 2002;13(5):601-04.
Giordani et al., Multifunctional hybrid materials composed of [60]fullerene-based functionalized-single-walled carbon nanotubes. Carbon. 2009;47(3):578-88.
Guo et al., Covalently bridging gaps in single-walled carbon nanotubes with conducting molecules. Science. Jan. 20, 2006;311(5759):356-9.
Hahm et al., Direct Ultrasensitive Electrical Detection of DNA and DNA Sequence Variations Using Nanowire Nanosensors. Nano Letters. 2004; 4(1):51-54.
Janata et al., Conducting polymers in electronic chemical sensors. Nat Mater. Jan. 2003;2(1):19-24.
Jung et al., Covalent attachment and hybridization of DNA oligonucleotides on patterned single-walled carbon nanotube films. Langmuir. Sep. 28, 2004;20(20):8886-91.
Kamat et al., Self-Assembled Linear Bundles of Single Wall Carbon Nanotubes and Their Alignment and Deposition as a Film in a dc Field. J Am Chem Soc. 2004;126(34):10757-62.
Khare et al., Carbon Nanotube Based Composites—A Review. Journal of Minerals & Materials Characterization & Engineering. 2005; 4(1):31-46.
Kolmakov et al., Chemical Sensing and Catalysis by One-Deminsional Metal-Oxide Nanostructures. Annu Rev Mater Res. 2004;34:151-80.
Kong et al., Nanotube molecular wires as chemical sensors. Science. Jan. 28, 2000;287(5453):622-5.
Liu et al., Fullerene pipes. Science. May 22, 1998;280(5367):1253-6.
Lobez et al., Radiation Detection: Resistivity Responses in Functional Poly (Olefin Sulfone)/Carbon Nanotube Composites. Angew Chem Int Ed. 2010; 49:95-98.
Lutz, 1,3-Dipolar cycloadditions of azides and alkynes: a universal ligation tool in polymer and materials science. Angew Chem Int Ed. 2007; 46:1018-25.
Maggini et al., Addition of Azomethine Ylides to $C_{60}$: Synthesis, Characterization, and Functionalization of Fullerene Pyrrolidines. J Am Chem Soc. 1993;115: 9798-99.
McQuade et al., Conjugated Polymer-Based Chemical Sensors. Chem Rev. 2000;100:2537-74.
Moses et al., The growing applications of click chemistry. Chem Soc Rev. Aug. 2007;36(8):1249-62. Epub May 3, 2007.
O'Donovan et al., Phosphine-catalysed cycloaddition of buta-2,3-dienoates and but-2-ynoates to [60]fullerene. Chem Commun. 1997:81-82.
Park et al., Enhancement of the field-effect mobility of poly(3-hexylthiophene)/functionalized carbon nanotube hybrid transistors. Org Electon. 2008;9:317-22.
Pederson et al., Core particle, fiber, and transcriptionally active chromatin structure. Annu Rev Cell Biol. 1986;2:117-47.
Potyrailo, Polymeric Sensoir Materials: Toward an Alliance of Combinatorial and Rational Design Tools? Agnew Chem Int Ed. 2006;45:702-23.
Prato et al., Fulleropyrrolidines: A Family of Full-Fledged Fullerene Derivatives. Acc Chem Res. 1998;31(9):519-26.
Preda et al., Addition of Dihalocarbenes to Corannulene. A Fullerene-Type Reaction. Tetrahedron Letters. 2000;41: 9633-37.
Qi et al., Toward Large Arrays of Multiplex Functionalized Carbon Nanotube Sensors for Highly Sensitive and Selective Molecular Detection. Nano Lett. 2003;3(3):347-51.
Raval et al., Determining ionizing radiation using sensors based on organic semiconducting material. Appl Phys Lett. 2009;94:123304-1-123304-3.
Rostovtsev et al., A stepwise huisgen cycloaddition process: copper(I)-catalyzed regioselective "ligation" of azides and terminal alkynes. Angew Chem Int Ed Engl. Jul. 15, 2002;41(14):2596-9.

Santhanam et al., A chemical sensor for chloromethanes using a nanocomposite of multiwalled carbon nanotubes with poly(3-methylthiophene). Sensors and Actuators B. 2005;106:766-71.

Scott, Fragments of Fullerenes: Novel Syntheses, Structures and Reactions. Pure & Appl Chem., 1996;68(2):291-300.

Serp et al., Carbon Nanotubes and Nanofibers in Catalysis. Applied Catalysis A: General. 2003;253:337-58.

Shu et al., Phosphine-catalysed [3+2] cycloadditions of buta-2,3-dienoates with [60]fullerene. Chem Commun. 1997;79-80.

Silverman, The Organic Chemistry of Drug Design and Drug Action. $2^{nd}$ ed. 2004;29-32.

Snow et al., Chemical detection with a single-walled carbon nanotube capacitor. Science. Mar. 25, 2005;307(5717):1942-5.

Star et al., Electronic Detection of Specific Protein Binding Using Nanotube FET Devices. Nano Lett. 2003;3(4):459-63.

Star et al., Nanoelectronic Carbon Dioxide Sensors. Adv Mater. 2004;16(22):2049-52.

Sun et al., Functionalized Carbon Nanotubes: Properties and Applications. Acc Chem Res. 2002;35(12):1096-1104.

Swager, The Molecular Wire Approach to Sensory Signal Amplificiation. Acc Chem Res. 1998;31:201-07.

Tang et al., Measurement of ionizing radiation using carbon nanotube field effect transistor. Phys Med Biol. Feb. 7, 2005;50(3):N23-31.

Tasis et al., Chemistry of Nanotubes. *Chem Rev.* 2006;106:1105-36.

Toal et al., Polymer sensors for niroaromatic explosives detection. Mater Chem. 2006;16:2871-83.

Tombler et al., Reversible electromechanical characteristics of carbon nanotubes under local-probe manipulation. Nature. 2000;405:769-72.

Wang et al., Carbon Nanotube/Polythiophene Chemiresistive Sensors for Chemical Warfare Agents. J Am Chem Soc. 2008;130:5392-93.

Wang et al., Novel multicomponent reaction of [60]fullerene: the first example of 1,4-dipolar cycloaddition reaction in fullerene chemistry. Org Biomol Chem. 2006;4:4063-64.

Wei et al., Covalent functionalization of single walled carbon nanotubes and fullerenes via a switterion approach. Chemical Abstracts. 2007. 2 pages.

Wei et al., Multifunctional chemical vapor sensors of aligned carbon nanotube and polymer composites. J Am Chem Soc. Feb. 8, 2006;128(5):1412-3.

Weizmann et al., DNA-CNT nanowire networks for DNA detection. J Am Chem Soc. Mar. 16, 2011;133(10):3238-41. Epub Feb. 22, 2011.

Yates et al., The absorption coefficient spectrum and radiatoin degradation of poly(butene-1 sulfone) in the soft X-ray region. J Poly Sci Part B Poly Phys. 1993;31:1837-44.

Zaharescu et al., Electrical properties of polyolefin blends under γ-radiation exposure. ICSD 2004. Proceedings of the 2004 Inter National Conference on Solid Dielectrics. Toulouse, France. Jul. 5-9, 2004. IEEE. Jul. 5, 2004;1:367-69.

Zhang et al., Covalent Functionalization of Singled Walled Carbon Nanotubes and Fullerenes via a Zwitterion Approach. Prep Pap.—Am Chem Soc, Div Fuel Chem.. 2007;52(1):126-28.

Zhang et al., Electochemically Functionalized Single-Walled Carbon Nanotube Gas Sensor. Electroanalysis. 2006;18(12):1153-58.

Zhang et al., Functionalization of single-walled carbon nanotubes and fullerenes via a dimethyl acetylenedicarboxylate-4-dimethylaminopyridine zwitterion approach. J Am Chem Soc. Jun. 27, 2007;129(25):7714-5. Epub Jun. 2, 2007.

Zhang et al., Modular Functionalization of Carbon Nanotubes and Fullerenes. J Am Chem Soc. 2009;131:8446-54.

Zhou et al., A New Method for the Functionalization of [60]Fullerene: An Unusual 1,3-Dipolar Cycloaddition Pathway Leading to a $C_{60}$ Housane Derivative. Organic Letters. 2005;7(26):5849-51.

International Preliminary Report on Patentability for PCT/US2010/051610 mailed Apr. 19, 2012.

International Preliminary Report on Patentability for PCT/US2010/055395 mailed May 18, 2012.

Georgakilas et al., Organic functionalization of carbon nanotubes. J Am Chem Soc. Feb. 6, 2002;124(5):760-1.

* cited by examiner

POS INCORPORATING 2-METHYL-1-PENTENE

US 8,426,208 B2

METHOD AND APPARATUS FOR DETERMINING RADIATION

RELATED APPLICATIONS

This application is a continuation of U.S. patent application Ser. No. 12/899,201, filed Oct. 6, 2010, and entitled "Method and Apparatus for Determining Radiation," by Swager et al., which application claims priority under 35 U.S.C. §119(e) to U.S. Provisional Patent Application Ser. No. 61/249,042, filed Oct. 6, 2009, and entitled "Method and Apparatus for Determining Radiation," each of which is incorporated herein by reference in its entirety for all purposes.

STATEMENT REGARDING FEDERALLY SPONSORED RESEARCH OR DEVELOPMENT

This invention was made with government support under Grant Nos. DMR0706408 and ECCS-731100, awarded by the National Science Foundation. The government has certain rights in this invention.

FIELD OF THE INVENTION

The present invention generally relates to devices and systems for determining ionizing radiation, and related methods.

BACKGROUND OF THE INVENTION

Detection and dosimetry of ionizing radiation are crucial in several fields such as energy, national security, biological and nuclear research, and in other advanced applications such as monitoring the attrition of materials in space travel. The most common systems for the detection and dosimetry of ionizing radiation usually have one or several of the following drawbacks: incapability to produce a real-time signal, expensive and/or complicated manufacturing, need for operation at low temperatures, low sensitivity to non-charged radiation, or voluminous size. Although organic materials present the advantages of being easily processed, synthetic versatility, and relatively low cost, deployment of organic systems as small size ionizing radiation detectors and dosimeters has been traditionally limited to the detection of charged particles, owing to the low cross sections of elements incorporated in these molecules towards uncharged radiation. Additionally, many devices for the detection and dosimetry of ionizing radiation suffer from drawbacks including inability to produce an in situ signal as is the case with film badges for dosimetry, expensive and/or complicated manufacturing, need for operation at low temperatures, low sensitivity to uncharged radiation, voluminous size like the Geiger counter, or the size and high voltages associated with $^3$He or $BF_3$ proportional tubes.

SUMMARY OF THE INVENTION

The present invention provides devices for determining ionizing radiation. In some embodiments, the device comprises a sensor material comprising a polymer material, wherein at least a portion of the polymer material undergoes a change in a polymerization characteristic upon exposure of the device to ionizing radiation, and a signal generator that generates a signal responsive to a change in polymerization characteristic, indicative of ionizing radiation.

In some embodiments, the device comprises a sensor material comprising a plurality of nanostructures positioned relative to each other so as to together define an average distance between adjacent nanostructures, wherein the average distance between adjacent nanostructures is altered upon exposure of the device to ionizing radiation, and a signal generator that generates a signal responsive to a change in the average distance between adjacent nanostructures, indicative of ionizing radiation.

The present invention also provides various methods for determining ionizing radiation. In some embodiments, the method comprises exposing a device comprising a polymer material to an environment suspected of containing ionizing radiation, wherein the ionizing radiation, if present, interacts with the polymer material such that at least a portion of the polymer material undergoes a change in a polymerization characteristic, thereby generating a determinable signal, and determining the signal.

In some embodiments, the method comprises exposing a device comprising a plurality of nanostructures positioned relative to each other at a distance so as to together define an average distance between adjacent nanostructures, to an environment suspected of containing ionizing radiation, wherein the ionizing radiation, if present, interacts with at least a portion of the device to alter the average distance between adjacent nanostructures, thereby generating a determinable signal, and determining the signal.

Figure 1:
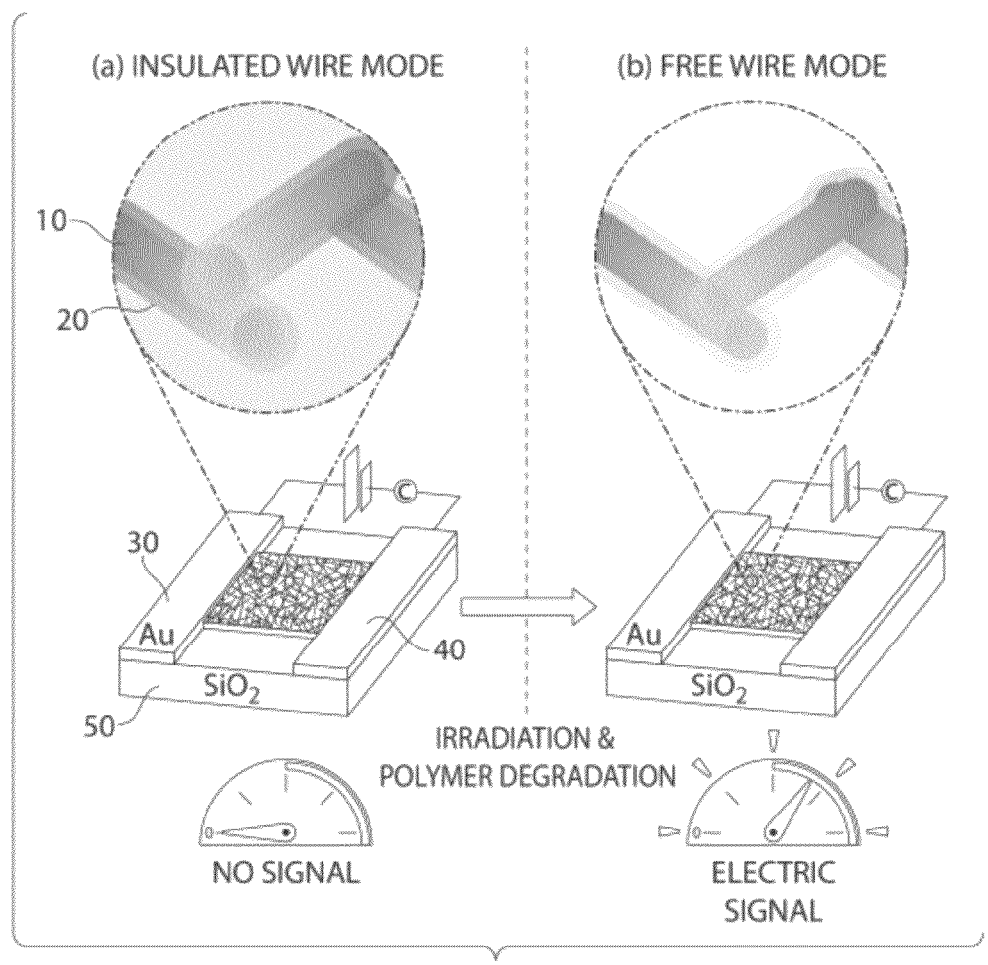
FIG. 1 shows a device for determination of ionizing radiation (a) before and (b) after exposure to ionizing radiation, where the device comprises nanostructures and a polymer material.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally provides devices and systems capable of interacting with ionizing radiation (e.g., gamma rays, neutrons) to produce an observable signal from the device, and related methods. In some cases, methods for in situ and/or real-time detection of ionizing radiation are provided.

The embodiments described herein may be useful in the determination, characterization, and/or dosimetry of at least one type of ionizing radiation. In some cases, the devices may exhibit high sensitivity to ionizing radiation and may distinguish between various types of radiation. Some embodiments may also provide simplified, less bulky sensor devices that may advantageously be operated at ambient temperature and/or without need for high voltages associated with $^3$He or BF$_3$ proportional tubes. Devices and methods described herein may provide an inexpensive, modular sensor platform having applications for energy, national security, biological and nuclear research, as well as other advanced applications such as monitoring the attrition of materials in space.

In some cases, ionizing radiation may be determined by monitoring, for example, a change in a signal of a material (e.g., sensor material) present within the device, upon exposure to ionizing radiation. In some cases, the change in signal may be associated with an interaction between the device and the radiation, a chemical reaction within the device, or a change in polymerization state of a component of the device. The signal may comprise an electrical, optical, or other property of the device, as described further below. For example, the method may involve use of a component having a resistance, where the resistance of the component is affected by (e.g., responsive to) ionizing radiation. Such as signal can be read-out by a simple, low power and low current circuit, without need for a bulky apparatus, like in the case of a Geiger counter. In other embodiment, the capacitance of a component is affected by ionizing radiation, where the change in capacitance may be determined without need for a complete circuit. In other embodiments, the method may involve use of a component having a luminescence emission (e.g., fluorescence), where a characteristic of the emission (e.g., wavelength, intensity, etc.) is affected by ionizing radiation.

Some embodiments of the invention may also provide devices, or systems comprising a plurality of devices, for determination of ionizing radiation and its energy. The device, or portion thereof, may interact with ionizing radiation such that a chemical event (e.g., chemical reaction, change in polymerization state) occurs, giving rise to a determinable signal, or change in signal. In some cases, a single chemical event within the device may trigger a cascade of events, which may produce an amplified response to ionizing radiation. As used herein, "ionizing radiation" is given its ordinary meaning in the art and refers to nuclei or subatomic particles or electromagnetic waves having sufficient energy to ionize an atom or molecule. Various types of ionizing radiation exist, including ultraviolet rays, X-rays, gamma rays, alpha particles, beta particles, neutrons, and electrons.

In some embodiments, the device may include a sensor material that may be affected by interaction with ionizing radiation, generating a determinable signal. In some cases, the device may comprise a sensor material that is responsive to one or more types of ionizing radiation. The sensor material may comprise a material that is capable of undergoing a change in one or more properties upon exposure to ionizing radiation. For example, the sensor material may include a conductive, semiconductive, or semimetallic material having electrical properties that may be affected by the presence of ionizing radiation. In some cases, the sensor material may include a luminescent material having optical properties that may be affected by the presence of an ionizing radiation. In some embodiments, the sensor material may include a material capable of undergoing a volumetric or dimensional change upon exposure to ionizing radiation. The devices described herein may be designed and fabricated to determine one or more types of ionizing radiation. In some embodiments, the device is designed and fabricated to determine gamma rays, neutrons, other types of radiation, or a combination thereof.

In some embodiments, the sensor material may comprise a conductive, semiconductive, semimetallic species, or other species capable of transporting charge to create a conductive pathway. The conductive, semiconductive, or semimetallic species may include inorganic materials (e.g., metals, alloys, semiconductors), organic materials (e.g., polymer materials), organometallic materials, and/or combinations thereof. In some cases, the sensor material may include a plurality of nanostructures (e.g., nanotubes, nanowires, nanoribbons, nanoparticles, etc.). The nanostructures may be selected to exhibit, for example, high charge mobilities and/or resistance to damage from ionizing radiation. In some cases, mixtures or assemblies of nanostructures may be utilized. Some embodiments may involve the use of carbon nanotubes, such as single-walled carbon nanotubes (SWCNTs) and/or multi-walled carbon nanotubes (MWCNTs), which can display relatively high charge mobilities (e.g., 100,000 $cm^2$/Vs for SWCNTs). In some cases, nanowires, such as gold, silver, copper, bismuth, gadolinium nanowires, may be used as the conductive species. In some cases, the conductive, semiconductive, or semimetallic species may comprise nanoparticles (e.g., gold nanoparticles).

In some embodiments, the nanostructures are positioned relative to one another in the device at a distance, so as to together define an average distance between adjacent nanostructures. In operation, ionizing radiation may affect the sensor material such that the average distance between adjacent nanostructures is altered (e.g., increased, decreased), indicating the presence and/or amount of ionizing radiation. For example, the distance between adjacent nanostructures may decrease, such that the nanostructures that have high charge mobility and/or high radiation damage threshold aggregate to form a circuit. Such changes in the electrochemical state of the nanostructures may be used to indicate the presence of ionizing radiation.

Changes in the relative position of nanostructures in the device may be achieved by, for example, arranging the nanostructures in combination with (e.g., dispersed within) a matrix responsive to ionizing radiation. For example, the sensor material may comprise a polymer material, wherein at least a portion of the polymer material may undergo a change in a polymerization characteristic upon exposure of the device to ionizing radiation. The change in polymerization characteristic may be, for example, a change in the degree of polymerization (e.g., increased polymerization, depolymerization, etc.), morphology, chemical structure, or other property of the polymer material. In some cases, the ionizing radiation may interact with the polymer material such that a portion of the polymer undergoes degradation or depolymerization. As used herein, the term "depolymerization" is given its ordinary meaning in the art and refers to a process by which a macromolecule (e.g., a polymer) is converted (e.g., decomposed, cleaved) into smaller compounds by cleavage of at least one bond of the macromolecule. For example, a polymeric species may be depolymerized into its monomeric constituents via cleavage of one or more bonds of the polymer backbone. In some embodiments, chain scission caused by gamma rays, neutrons, or other forms of radiation can result in disassembly of polymer chains.

Some embodiments may involve the use of a polymer material that, upon exposure to ionizing radiation, generates at least one initiator species capable of causing a change in a polymerization characteristic of at least a portion of the sensor material. For example, depolymerization of a first polymer may generate a plurality of initiator species capable of effecting depolymerization of a second polymer, thereby producing an amplified response from the device. The first and second polymers may be the same type of polymer species or may be different polymers species (e.g., may have different chemical structures).

In one set of embodiments, the sensor material comprises carbon nanotubes and a polymer material integrally connected to at least a portion of the plurality of carbon nanotubes. The term "integrally connected," when referring to two or more objects, means objects that do not become separated from each other during the course of normal use, i.e., separation of the objects generally requires at least the use of tools, and/or by causing damage to at least one of the components, for example, by breaking, peeling, dissolving, etc. In some cases, the carbon nanotubes are dispersed within the polymer material, such that individual nanotubes have minimal or substantially no physical contact with adjacent nanotubes.

The device may further comprise a first electrode and a second electrode arranged in electrochemical communication with the sensor material, where current flow between the electrodes is affected by the sensor material. FIG. 1A shows an illustrative embodiment of a device, prior to exposure to ionizing radiation, where nanostructure 10 is insulated from an adjacent nanostructure by polymer material 20. That is, the nanostructures are dispersed within the polymer material, preventing optimal contact between the nanostructures and resulting in high resistance and low conductivity (e.g., no signal). The polymer material maintaining the nanojunctions between nanostructures serves as an insulating matrix that is thermally stable, but depolymerizes rapidly with a radiation induced chain scission event, thus placing the nanostructures at the cusp of a percolative threshold to forming a circuit between the two electrodes. Upon exposure to radiation, as shown in FIG. 1B, at least a portion of polymer material 20 may undergo depolymerization, resulting in aggregation of the nanostructures and producing a conductive network with decreased resistance and increased conductivity (e.g., signal generation). The increase in conductivity may be detected by amperometry (measurement over time of the current intensity, I, between two electrodes at a constant potential, V), or other methods.

The sensor material may comprise one or more additional components that may enhance the stability of the device and/or responsiveness of the device to ionizing radiation. In some cases, the sensor material includes at least one additive that facilitates interaction between the sensor material and ionizing radiation, improves sensitivity for a particular type of ionizing radiation, or otherwise enhances performance of the device. In some cases, the additive may associate with the sensor material such that it enhances an electrical, optical, or other property of the sensor material. The additive may be positioned within the sensor material such that interaction of the ionizing radiation with the additive causes, enhances, or otherwise facilitates a determinable change in signal upon exposure to an ionizing radiation. For example, a sensor material may comprise an additive positioned in sufficient proximity physically, or within sufficient electronic or inductive communication range, to one or more components of the device able to generate a signal. In some embodiments, the additive may be covalently attached to a component (e.g., polymer material) of the device, or may be dispersed within a component (e.g., sensor material) of the device. In some embodiments, the sensor material may comprise a plurality of additives.

The additive may be selected to enhance the sensitivity of the interaction between the ionizing radiation and the sensor material. For example, incorporation of a plurality of additives within the device may improve the interaction between the sensor material and the ionizing radiation, producing a large change in signal. In some cases, the additive (e.g., a metal-containing additive) may have high opacity to radiation, and may increase the cross-section value of the sensor material for interaction with ionizing radiation, such that a determinable signal may be observed. The additive may be also selected to enhance the selectivity of the interaction between the ionizing radiation and the sensor material. For example, additives may be selected such that the sensor material interacts with a particular type of ionizing radiation to a greater extent than others, or with more than one type of ionizing radiation. That is, the sensor material may comprise additives which distinguish between different forms of radiation (e.g., gamma rays, neutrons) present within a sample.

In some embodiments, the sensor material may comprise a metal-containing group, such as a metal complex or a metal nanoparticle. The metal-containing group may be selected to have a high opacity for one or more types of ionizing radiation. In some cases, the metal-containing group may have a high opacity for gamma rays. In some cases, the metal-containing group may have a high opacity for neutrons. For example, the metal may be selected to have a high atomic number, as the cross-section values for the interaction of gamma-rays with different elements increases with increasing atomic number. In some embodiments, the metal-containing group comprises a heavy metal. Incorporation of such additives within the sensor material may increase the capture cross-section and sensitivity of the device for one or more types of ionizing radiation. In some embodiments, incorporation of an additive within the sensor material may increase the sensitivity of the device to ionizing radiation, or a specific type of radiation, by at least about 5%, at least about 10%, at least about 20%, at least about 40%, at least about 60%, at least about 80%, at least about 100%, at least about 200%, or greater.

In one set of embodiments, the metal-containing group comprises bismuth. Bismuth (Bi) is the element with the highest atomic number element that does not have naturally abundant radioactive isotopes with short half lives. In some cases, incorporating bismuth-containing species within the sensor material may increase the opacity (e.g., cross-section) of the sensor material towards radiation such as gamma rays. Bismuth may form stable compounds with direct bismuth-carbon bonds, and the metal centers may have relatively low coordination numbers. Species comprising triphenyl bismuth, $Bi(Ph)_3$, for example, can be readily synthesized. In some embodiments, a bismuth-containing species may be incorporated into polymer materials described herein using click chemistry, as described more fully below.

Figure 5:
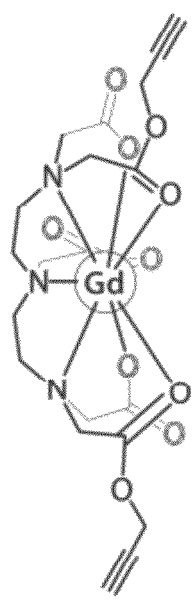
FIG. 5 shows a gadolinium-containing compound that may be appended to an azide-containing polymer via "click" chemistry.

In another set of embodiments, the metal-containing group comprises gadolinium. Gadolinium (Gd) has the second highest cross-section for interaction with neutrons after $^{135}Xe$ and gadolinium-containing species have been utilized as a relaxation agent for creating contrast in MRI imaging. In some cases, incorporation of gadolinium-containing species within the polymer material may increase the opacity of the sensor material towards neutrons. Various gadolinium-containing species may be designed and synthesized using methods known in the art, including click chemistry. As an illustrative embodiment, FIG. 5 shows a gadolinium-containing compound that may be appended to an azide-containing polymer via "click" chemistry.

Some embodiments may involve incorporation of metal nanoparticles within the sensor material. In some cases, nanoparticles of varying sizes may be incorporated into the device to create differential responses to different energy radiation. As used herein, the term "nanoparticle" generally refers to a particle having a maximum cross-sectional dimension of less than about 10 μm, less than about 5 μm, or, in some cases, about 1 μm or less. In some embodiments, the nanoparticle may have a maximum cross-sectional dimension of about 1 μm (e.g., slightly more than 1 μm). Nanoparticles may comprise inorganic or organic, ceramic, semiconductor, metallic, non-metallic, magnetic, crystalline (e.g., "nanocrystals"), or amorphous material, or a combination of two or more of these. The nanoparticles may be also selected to be positively or negatively charged. Typically, nanoparticles may have a particle size less than 250 nm in any dimension, less than 100 nm in any dimension, or less than 50 nm in any dimension. In some embodiments, the nanoparticles may have a diameter of about 2 to about 50 nm. In some embodiments, the nanoparticles may have a diameter of about 2 to about 20 nm. The particle size may be measure by methods known in the art, such as electron microscopy.

Figure 11A:
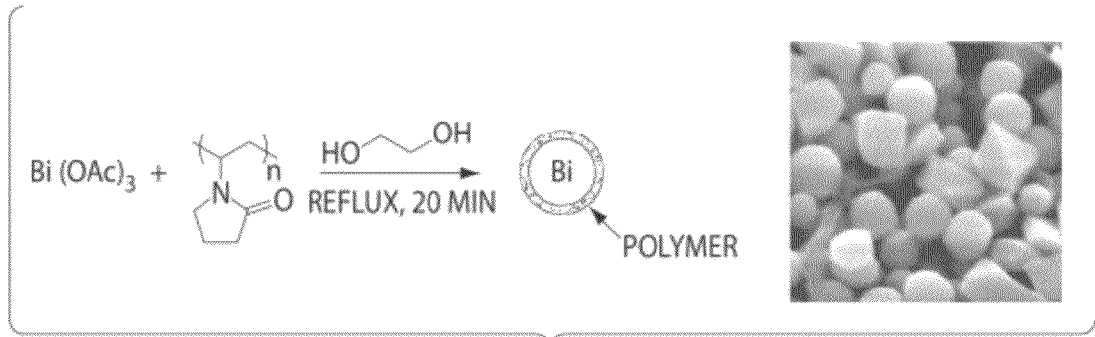
FIGS. 11A-C show the syntheses of a polymer-coated bismuth nanostructures.
Figure 11B:
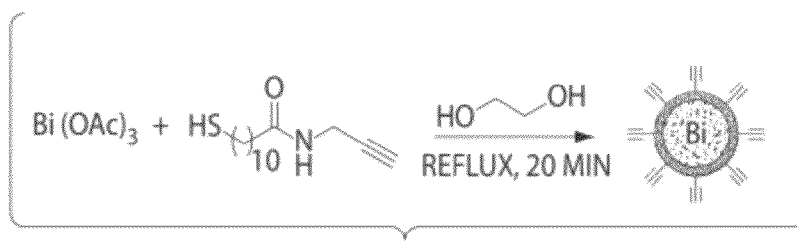
Figure 11C:
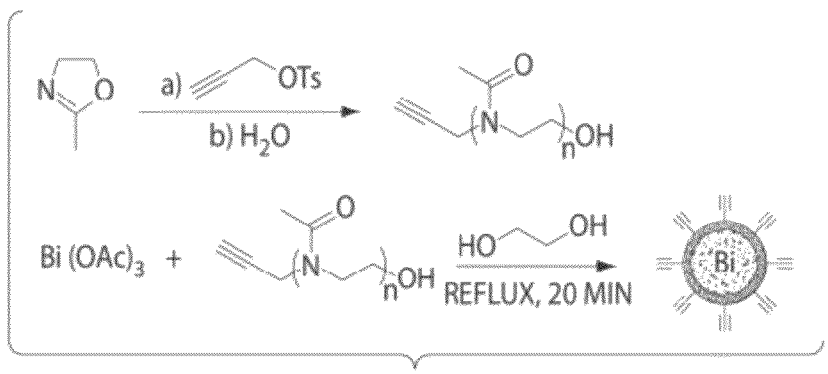

FIG. 11A shows a method for incorporating such nanoparticles into the device, where a dispersion of polymer-coated bismuth nanoparticle is formed. The polymer coating can be washed away and the materials can be redispersed with other polymer coatings (e.g., POS coatings). Those of ordinary skill in the art would be able to select other methods for incorporating nanoparticles into the devices described herein. For example, as shown in FIG. 11B, the affinity of Bi nanoparticle to thiols can be used to attach alkynes to the surface of the nanoparticles. The alkyne-substituted nanoparticles may then be reacted with azide-containing polymers via click chemistry. Alternatively, nanoparticles may be synthesized with an alternative polyamide containing an acetylene end-group, as shown in FIG. 11C.

Additives for facilitating processing and/or improving stability of the device may also be incorporated into the sensor material. In some embodiments, the sensor material may include a species that can improve or enhance the compatibility (e.g., miscibility, solubility) of the various components of the sensor material. Such additives may be useful in the formation of stable nanostructure dispersions and/or films. For example, the sensor material may comprise a plurality of nanostructures, a polymer material in which the nanostructures are dispersed, and a species capable of associating with nanostructures (e.g., carbon nanotubes) to enhance the compatibility of the nanostructures with the polymer material. In some cases, the species may interact with the nanostructures via a bond, such as a covalent bond, an ionic bond, a hydrogen bond (e.g., between hydroxyl, amine, carboxyl, thiol and/or similar functional groups, for example), a dative bond (e.g. complexation or chelation between metal ions and monodentate or multidentate ligands), or the like. The interaction may also comprise Van der Waals interactions. In some cases, the interaction between the species and the nanostructure may comprise a non-covalent bond. In some embodiments, non-covalent interactions between the species and the nanostructures may be advantageous in that the electronic structure of the nanostructures may not be substantially affected (e.g., perturbed), and the high carrier mobility of the nanostructures may be maintained.

In some embodiments, the species may interact with the nanostructures via pi-pi-stacking interactions. Examples of such species include aromatic moieties, such as polycyclic aromatic hydrocarbons. In some embodiments, the sensor material comprises pyrene groups, which are known to bind to the surface of a carbon nanotube pi-pi stacking. The aromatic moieties may be covalently bound to the polymer material, or may otherwise be associated with the polymer material.

Figure 2:
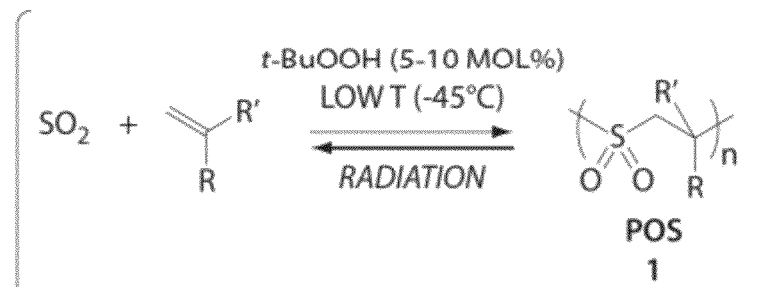
FIG. 2 shows an example of the synthesis of poly(olefin sulfone)s.

The polymer material may comprise any polymer having sensitivity to ionizing radiation, i.e., any polymer that undergoes a change in polymerization characteristic upon exposure to ionizing radiation. For example, the polymer species may be depolymerized to produce one or more volatile species that may be removed from the device (e.g., via evaporation). In one set of embodiments, the polymer material may comprise an optionally substituted poly(olefin sulfone) (POS), which may undergo chain-scission and depolymerization in the presence of ionizing radiation to produce sulfur dioxide and an olefin species. POSs have been used as electron beam resists and may degrade in the presence of ionizing radiation (e.g., high energy electrons, gamma rays). Such polymers may be synthesized via radical chain growth polymerization of sulfur dioxide ($SO_2$) and an olefin, as shown in FIG. 2. In some cases, conditions for the synthesis of POSs involves bulk polymerization at low temperatures with condensed liquid $SO_2$ as the solvent and t-butyl hydroperoxide as the initiator. Polymers obtained in this manner typically show a 1:1 ratio of perfectly alternating sulfone and olefin units when there is an alkyl moiety directly linked to the olefinic residue.

Those of ordinary skill in the art would be able to select the appropriate monomer species and polymerization conditions suitable for use in a particular application. In some cases, olefins used for polymerization is electron-rich, sterically unhindered, non-basic, and/or is at least partially solubility in $SO_2$.

$$\Delta G = \Delta H - T\Delta S \quad \text{(Equation 1)}$$

Thermodynamically, the polymerization to form POSs typically proceeds (negative $\Delta G$ in Eq. 1) at low temperature (T) due to the decrease in entropy, a negative $\Delta S$ term, in the polymerization process. At higher temperature, the polymerization may occur to a lesser degree, or not at all, since the $-T\Delta S$ term in Eq. 1 causes the polymerization to be endothermic (positive $\Delta G$). The POS structures are kinetically stable at ambient and even elevated temperatures because they are kinetically trapped by strong bonds at the terminus of the polymer chains. Since these bonds are not readily thermalized at temperatures of interest, the materials can have good shelf life and can be used over a range of conditions. However, once a chain is broken by a radiation induced event the polymer rapidly depolymerizes into its monomeric components. That is, the diffusion of monomer may advantageously drive the depolymerization.

In some embodiments, the sensor material comprises a polymer having the structure,

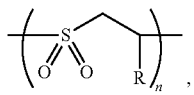

wherein R is alkyl, heteroalkyl, alkenyl, heteroalkenyl, alkynyl, heteroalkynyl, aryl, heteroaryl, any of which may be substituted; and n is 1 or greater. In some embodiments, R is alkyl, optionally substituted with an azide group or a polycyclic aromatic hydrocarbon. In another embodiment, R is alkyl, optionally substituted with COOR', wherein R' is H, alkyl, aryl, heteroalkyl, heteroaryl, or a metal-containing species. In a particular embodiment R' is a metal-containing complex or species (e.g., gadolinium).

In some cases, the sensor material comprises a polymer having the structure,

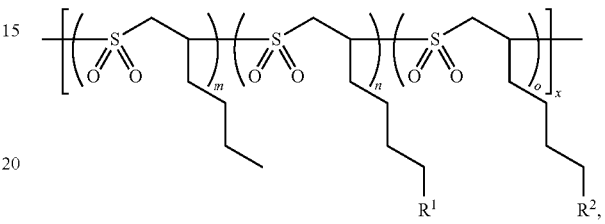

wherein $R^1$ and $R^2$ can be the same or different and are alkyl, heteroalkyl, alkenyl, heteroalkenyl, alkynyl, heteroalkynyl, aryl, heteroaryl, any of which may be substituted; m, n, and o can be 0 or greater, provided that at least one of m, n, and o is 1 or greater; and x is 1 or greater.

In some cases, the sensor material comprises one or more of the following polymers,

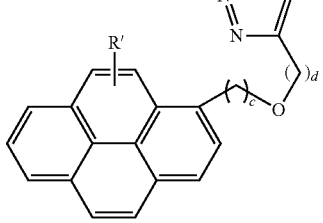

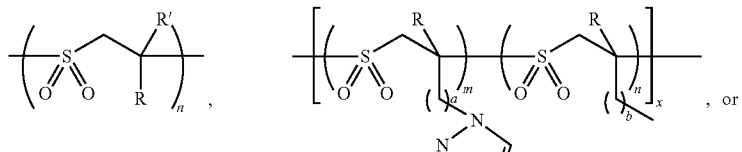

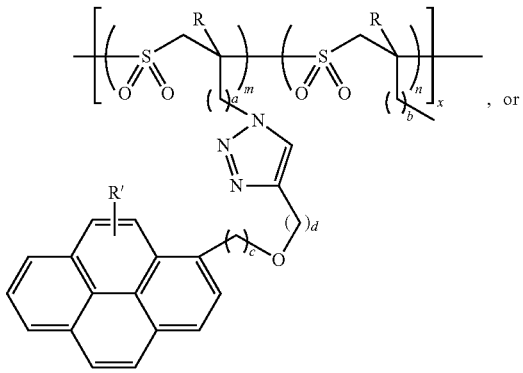

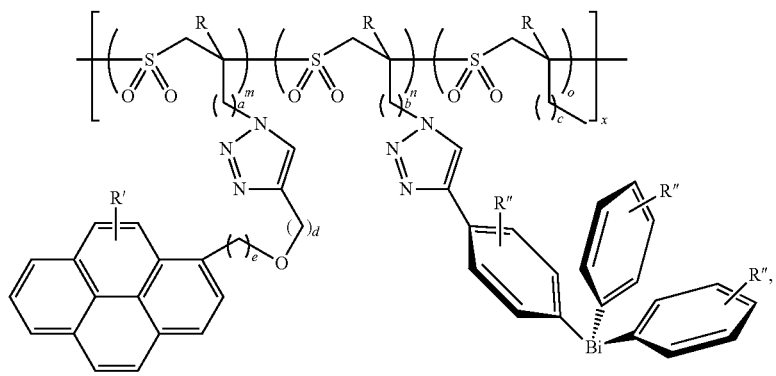

wherein R, R', and R" may be the same or different and may be alkyl, heteroalkyl, alkenyl, heteroalkenyl, alkynyl, heteroalkynyl, aryl, heteroaryl, any of which may be substituted; a, b, c, d, and e are 0 or greater; and m, n, and o can be 0 or greater, provided that at least one of m, n, and o is 1 or greater; and x is 1 or greater. In some embodiments, the sensor material comprises one or more of the following polymers,

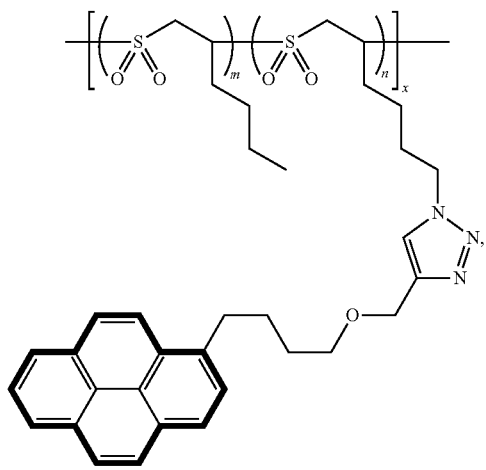

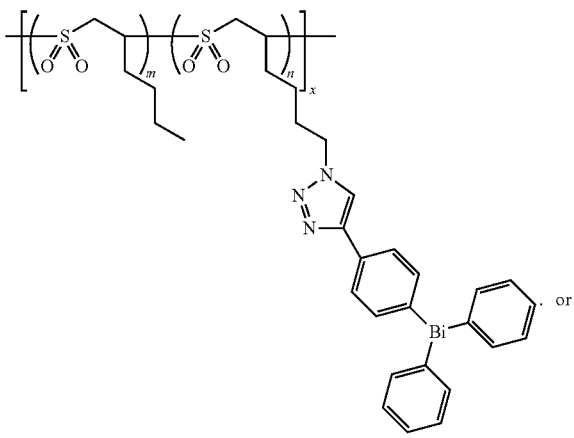

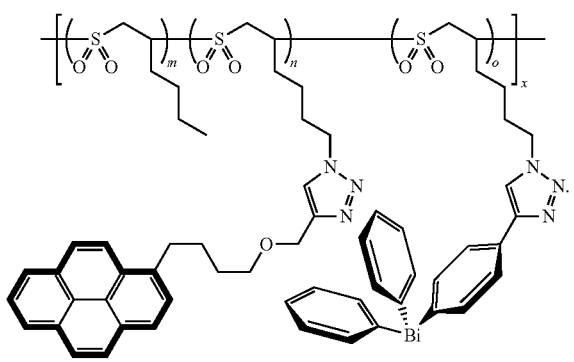

The sensor material may also comprise a mixture of polymers, as described more fully below.

In some embodiments, sensor material comprises the polymer:

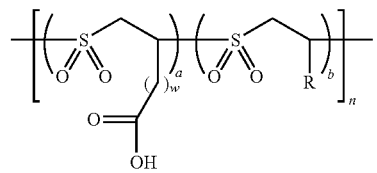

wherein a, b, w, and n are each individually 0 or greater, R is alkyl, aryl, heteroalkyl, heteroaryl, each optionally substituted. In some cases, a, b, w, and n are each individually 1, or 2, or greater. In some cases, a and b are 1, 2, 3, 4, or 5. In some cases, a is 1 and b is 1, 2, 3, 4, 5. In some cases, R is alkyl, for example, butyl. In some cases, w is 1, 2, 3, 4, 5, or in a particular embodiment 1. A specific example of a polymer is:

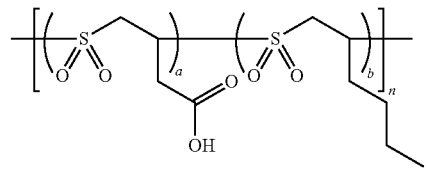

wherein a is 1, b is 3, and n is 40. The COOH group (or COO— group) may be used to associate with a metal-containing complex or species (e.g., gadolinium). For example, see Example 15.

Figure 8:
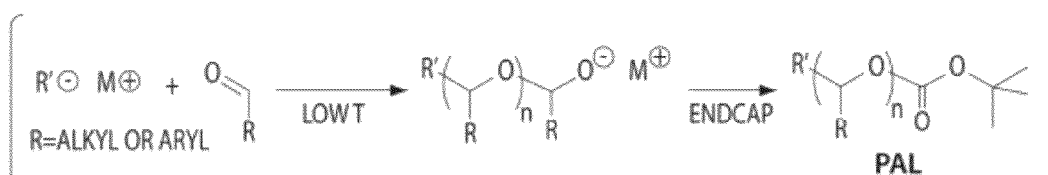
FIG. 8 shows the synthesis of a polyaldehyde (PAL) containing an endcap.

In another example, the polymer material may comprise optionally substituted polyaldehydes (PALs), which may depolymerize in the presence of ionizing radiation to produce aldehyde species. PALs, as shown in FIG. 8, are a class of thermodynamically unstable, but kinetically stable, polymers, which can be synthesized by anionic polymerization. Typically, PALs are stabilized when the oxygen termini of the polymers are prevented from depolymerization by endcapping reactions. As shown in FIG. 8, polyaldehydes can be synthesized and then capped to create stable compositions. Chain scission and depolymerization can be accomplished through a radiation-induced ionization event. For example, PAL chains may be depolymerized with an acid species. In some cases, the acid may be generated in situ, as described more fully below. The choice of endgroup can affect the sensitivity of the polymer to acid. In the polymer shown in FIG. 8, the carbonate end group may be cleaved in the presence of acid. Alternatively, different choices of pendant groups (e.g., R groups) on the polymer can also be used to adjust the acid sensitivity for optimizing device stability.

Those of ordinary skill in the art would be able to select the appropriate polymers suitable for use in a particular invention. A simple screening test for the selection of polymer material may be to expose a polymer to ionizing radiation and to monitor the change in polymerization characteristic, or lack thereof, of the polymer. For example, a polymer may be exposed to ionizing radiation and may be monitored by optical spectroscopy, or simply by sight, to determine if depolymerization occurs, i.e., if the polymer depolymerizes into volatile monomeric species, which then evaporate.

Figure 7:
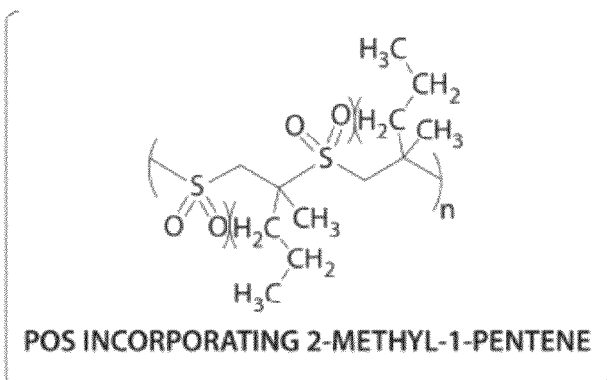
FIG. 7 shows a poly(olefin sulfone) (POS) incorporating 2-methyl-1-pentene.

In some embodiments, the polymer material may be tailored to have enhanced sensitivity to ionizing radiation. For example, polymer materials that readily depolymerize upon exposure to ionizing radiation may be designed and synthesized. That is, polymers having a relatively lower polymerization ceiling temperature ($T_C$) may be selected for use in the device. The addition of substituents in the polymer backbone can be a highly effective means to lower the ceiling temperature and, as shown in Table 1, copolymers of 2-methyl-1-pentene exhibit a dramatically lower $T_C$ as compared to other POS materials. FIG. 7 shows an example of a poly(olefin sulfone) incorporating 2-methyl-1-pentene. Without wishing to be bound by theory, this effect may be attributed to the increased steric congestion about the polymer backbone and the interactions between the sulfone groups and the alkyl groups are illustrated in FIG. 7. In some cases, polymerization of these materials are carried out at lower temperatures, and, once synthesized, the materials are kinetically stable to temperatures over 100° C. Using such materials, the rate of depolymerization upon radiation-induced chain scission of such materials may be increased.

TABLE 1

Ceiling temperatures for POS materials synthesized by copolymerization of the olefin shown with $SO_2$.

| Olefin Monomer | Tc (° C.) |
| --- | --- |
| 1-butene | 62 |
| 1-pentene | 44.5 |
| 1-hexene | 60 |
| 1-hexadecene | 48.5 |
| 2-methyl-1-pentene | −32.5 |
| 3-methyl-1-butene | 36.5 |

In one set of embodiments, the sensor material may comprise a mixture of polymers, each polymer capable of undergoing a change in a polymerization characteristic upon exposure to ionizing radiation. In some cases, a multistage, cascade event may occur, where a change in a polymerization characteristic of a first polymer may cause a change in a polymerization characteristic of a second polymer. For example, the sensor material may comprise a first polymer and a second polymer, and exposure to ionizing radiation results in depolymerization of the first polymer to produce an initiator species, which may then interact with the second polymer to result in depolymerization of the second polymer.

Figure 9:
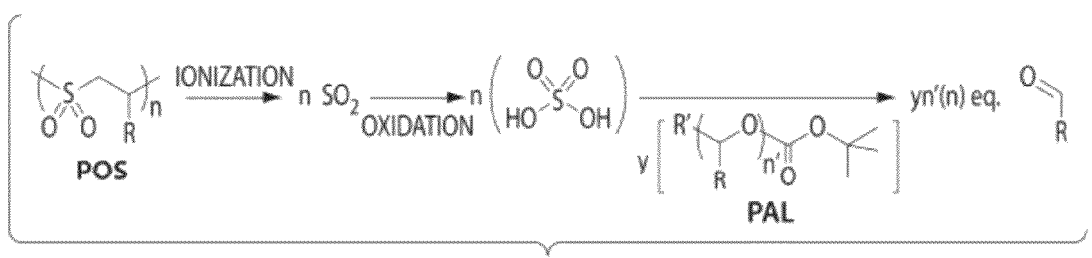
FIG. 9 shows a cascade of chemical reactions involving depolymerization of a poly(olefin sulfone) and a polyaldehyde.

FIG. 9 shows an illustrative embodiment of a multistage cascade event that may be utilized in the context of the invention. In the case of POSs, a single chain scission event may generate many equivalents of $SO_2$, which may either escape from the material as a gaseous material or may be oxidized (e.g., by metal oxides like $V_2O_5$) to generate sulfuric acid ($H_2SO_4$), which can catalyze the depolymerization of PAL materials. Due to this catalytic activity, one equivalent of the acid may depolymerize a number of PAL chains. Thus, a multistage cascade event may occur, wherein a single ionization event creates many (n) molecules of $SO_2$, and each $SO_2$ creates a molecule of acid, which in turn catalyzed a multitude (y) of depolymerized PALs with each polymer liberating n' equivalents of aldehyde. In some cases, n≈100, y≈10, n'≈100, and $10^5$ equivalents of monomer may be released from a single chain scission event. In this way, systems capable of high sensitivity to ionization events may be realized.

Those of skill in the art would be able to identify other materials having complementary reactivity to perform such a cascade reaction. For example, the materials may be selected such that a first polymer is capable of producing a species that may catalyze depolymerization of a second polymer.

Figure 10:
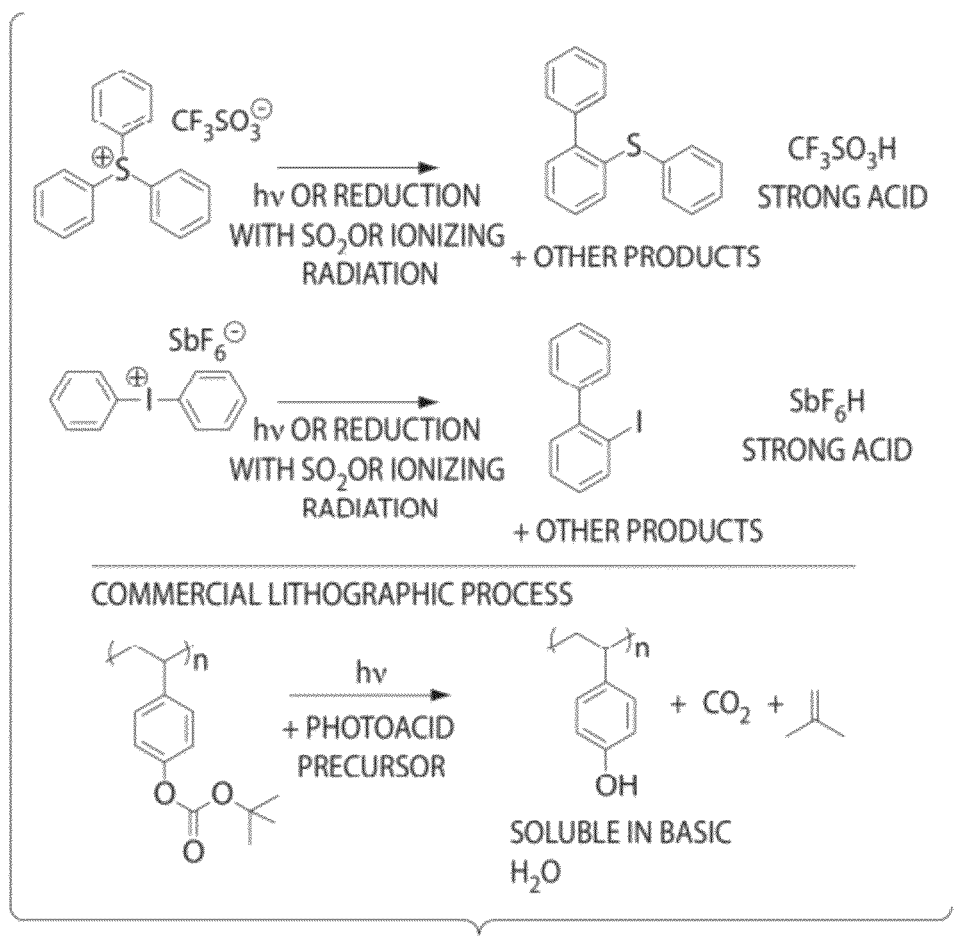
FIG. 10 shows examples of cationic complexes useful in chemically amplified lithography.

In another set of embodiments, the sensor material may comprise an additive that may interact with ionizing radiation to produce an initiator species. The initiator species may then interact with a polymer material, or portion thereof, to cause a change in a polymerization characteristic of the polymer material (e.g., depolymerization). For example, one method for generating an initiator species, such as an acid, either directly or indirectly from a radiation event is to employ initiators used in chemically amplified lithography. In this method, stable cationic complexes may be placed into a polymer matrix, where exposure to light creates a strong acid. FIG. 10 shows examples of various additives that are capable of generating initiator species upon exposure to radiation. Other photoacid generators or photoresist additives may also be used in the context of this invention, where photoexcitation of a cationic acid precursor results in their reduction by electron transfer processes. In the case of the iodine containing photoacid generators, the heavy atoms may help to increase the reactive cross-section.

Some devices may be fabricated such that two or more different types of ionizing radiations may be determined. In some cases, the sensor material may include a gradient of materials capable of determining a wide range of radiation. That is, the device may comprise components that may specifically interact with various types of ionizing radiations. For example, the sensor material may include a plurality of metal-containing groups, each group having a different cross-section value for interaction with ionizing radiation. In some cases, the device may be fabricated such that it includes at least two different types of species (e.g., metal atoms or nanoparticles), each selected to interact with a specific type of ionizing radiation, such that various changes in the signal(s) produced by the device may be attributed to a particular form of ionizing radiation. The species may differ in chemical structure, size, or other properties. In an illustrative embodiment, the sensor material may comprise both bismuth atoms or nanoparticles, which may enhance the opacity of the sensor material to gamma rays, and gadolinium atoms or nanoparticles, which may enhance the opacity of the sensor material to neutrons. It should be understood that the device may contain any number of additives for determining ionizing radiation.

In another set of embodiments, a system may include an array of individual devices having varying levels of sensitivity to different types of radiation, creating a spectrometer that can identify more than one type of radiation. Array devices can be created, for example, for spectroscopic detection of gamma rays of different energies, or for discrimination between thermal and fast neutrons. In a particular embodiment, devices capable of detecting radiation as part of distributed sensor arrays are provided. Distributed arrays can be used to monitor transportation systems, shipping containers, or distributed in other areas of interest. In addition to non-proliferation applications, these devices can have applications in occupational safety and will enable individuals to know immediately if they are being exposed to radiation.

The devices described herein may comprise additional components, such as a signal generator that generates a signal responsive to a change in polymerization characteristic, and a detector component positioned to detect the signal. In one set of embodiments, the device may be a chemiresistor device, wherein the device exhibits changes in electrical resistance upon exposure to an ionizing radiation. Chemiresistors may be advantageous in that the resistance changes can be readout by a simple, low power and low current circuit. In other embodiments, a device of the present invention may exhibit signals, or changes in signals, that may be determined using Raman spectroscopy, adsorption and/or emission photophysics, ellipsometry, atomic force microscopy, scanning electron microscopy, electrode passivation, and the like.

As described herein, the polymer material may be functionalized with one or more species to improve performance of the device. In some embodiments, a modular approach to the functionalization of polymer materials is provided, allowing for the integration of a wide range of functionality into the polymer matrix. For example, the method may involve use of a polymer or monomer species capable of reacting via a 1,3-dipolar cycloaddition reaction, i.e., via "click chemistry." That is, a polymer or monomer species may comprise a dipolarophile group (e.g., an alkyne) that is reacted with a 1,3-dipolar compound. Alternatively, a polymer or monomer species may comprise a 1,3-dipolar compound (e.g., an azido group) that is reacted with a dipolarophile. In some embodiments, functionalization may be performed prior to formation of the polymer, i.e., functionalization of a monomer species may be performed. In some embodiments, functionalization may be performed after formation of the polymer, i.e., functionalization of a polymer species may be performed.

The 1,3-dipolar cycloaddition reaction may be performed under conditions that may be unreactive to the remainder of the species other than the dipolarophile or 1,3-dipolar compound. In an illustrative embodiment, a polymer material may contain an azido group, which may be further reacted with an alkyne species to form a triazole group. Such a strategy may be useful, for example, for incorporating various groups or additives described herein into a polymer material. Those of ordinary skill in the art would be able to select the appropriate reaction conditions and additives suitable for a particular 1,3-dipolar cycloaddition reaction. Methods for performing 1,3-dipolar cycloaddition reactions are also described, for example, in *Synthetic Applications of 1,3-Dipolar Cycloaddition Chemistry Toward Heterocycles and Natural Products*, A. Padwa, W. H. Pearson, Wiley-Interscience, 2002, the contents of which are incorporated herein by reference.

Figure 18:
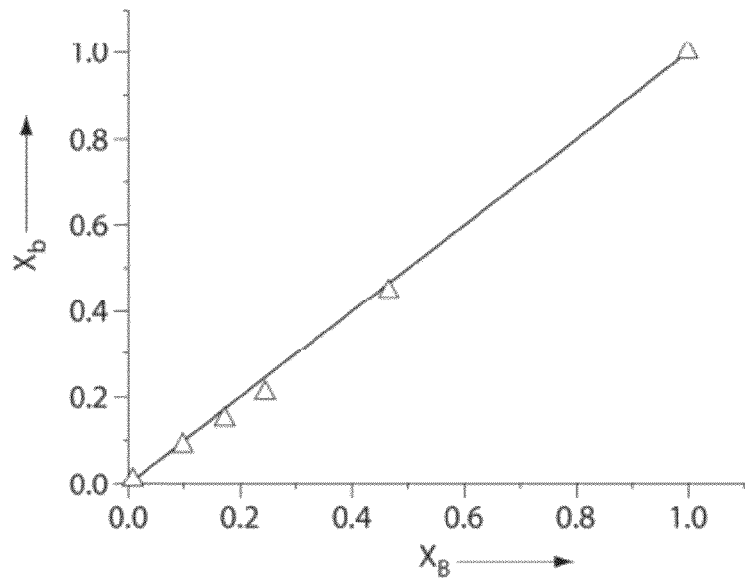
FIG. 18 shows a graph of the molar ratio of 6-azido-1-hexene ($X_B$) in the feed (x axis) vs. molar ratio of repeat unit containing azide monomer ($X_b$), as determined by $^1$H-NMR.

In one set of embodiments, a series of azide-containing poly(olefin sulfone)s may be synthesized. (FIG. 3) In some embodiments, the composition of the resulting polymers may be the same as the feed ratio, indicating that quantity of azides in a polymer can be perfectly controlled, as shown in the table in FIG. 3 and FIG. 18. In some cases, the polymerization may advantageously have a random sequence of monomer units.

Figure 4A:
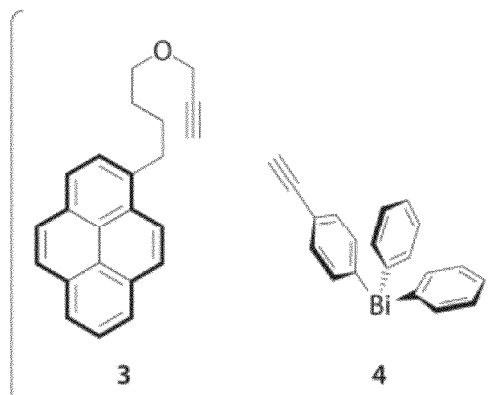
FIG. 4A illustrates examples of alkyne-containing species that may be reacted via "click" chemistry.

In some embodiments, the method involves synthesis of a polymer comprising the structure,

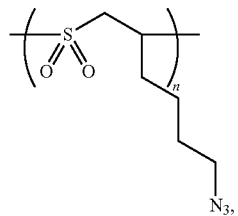

wherein n is 1 or greater, following by reaction of the polymer with at least one type of alkyne-containing species. The alkyne-containing species may comprise any of the additives described herein, including metal-containing species, aromatic groups, and the like. FIG. 4A illustrates examples of alkyne-containing species that may be reacted with the polymer via "click" chemistry. The degree of functionalization of the polymer may be controlled, based on the quantity of azides in the polymer starting material.

In some embodiments, the method involves synthesis of a polymer comprising the structure,

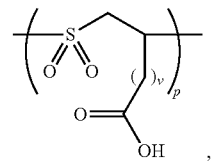

wherein p is 1 or greater (e.g., 1, 2, 3, 4, 5, etc.) and v is 0 or greater (e.g., 0, 1, 2, 3, 4, 5, etc.). In some cases, v is 0 or 1. Methods for synthesizing such polymers will be known to those of ordinary skill in the art (e.g., see Example 15).

Methods for determining ionizing radiation are also provided. As used herein, the term "determining" generally refers to the analysis of a species or signal, for example, quantitatively or qualitatively (whether an analyte is present and/or in what amount or concentration), and/or the detection of the presence or absence of the species or signals. "Determining" may also refer to the analysis of an interaction between two or more species or signals, for example, quantitatively or qualitatively, and/or by detecting the presence or absence of the interaction. For example, the method may include the use of a device capable of producing a first, determinable signal (e.g., a reference signal), such as an electrical signal, an optical signal, or the like, in the absence of ionizing radiation. The device may then be exposed to ionizing radiation, wherein the ionizing radiation may interact with one or more components of the device to cause a change in the signal produced by the device. Determination of the change in the signal may then determine the analyte. The signal may, in some cases, provide information relating to the presence, identity, amount, and/or other characteristic of the ionizing radiation.

In some embodiments, the change in signal may occur upon interaction between ionizing radiation and at least a portion or component of the device. For example, the ionizing radiation may contact or may permeate an interior portion of the sensor material. In some embodiments, a volumetric or dimensional change (e.g., increase, decrease) of the sensor material may occur upon interaction with an analyte. In some cases, the interaction between the sensor material and the ionizing radiation may comprise a reaction, such as a depolymerization reaction. For example, the method may involve exposure of the device to an environment suspected of containing ionizing radiation, wherein the ionizing radiation, if present, interacts with the polymer material such that at least a portion of the polymer material undergoes a change in a polymerization characteristic, which generates a determinable signal. In some cases, exposure of the device to an environment suspected of containing ionizing radiation, results in a change in the average distance between adjacent nanostructures, which generates a determinable signal. Determination of the signal may then determine the ionizing radiation.

In some embodiments, the device comprises a first electrode and a second electrode in electrochemical communication with the sensor material, such that the determinable signal comprises a change in resistance to current flow between the first and second electrodes. For example, the resistance may decrease upon exposure to ionizing radiation. In some cases, methods described herein may determine an ionizing radiation with relatively high selectivity and/or specificity. For example, the device may comprise a sensor material that is responsive to a particular type of ionizing radiation and is substantially unresponsive to other types of ionizing radiation or is responsive to a lesser degree, such that the change in signal may be attributed to an interaction between the sensor material and the particular type of ionizing radiation. In some cases, the method may involve determination of more than one type of ionizing radiation present within a sample. For example, the interaction between a first type of ionizing radiation and the sensor material may give a first change in the properties (e.g., electrical properties) of the sensor material, while the interaction between a second type of ionizing radiation and the sensor material may give a second, different change in the properties of the sensor material, such that distinguishable changes in signal may be determined for both the first and second types of ionizing radiation.

In some cases, the ionizing radiation may produce a colorimetric change within the device, wherein observation of a visible change in color may determine the analyte. In some embodiments, the ionizing radiation may produce a change in an absorption or luminescence spectrum of the device. For example, metal nanoparticles (e.g., silver and/or gold nanoparticles) may be incorporated within the sensor material to create sensors that provide a visual signal to radiation. In these schemes the small particle sizes may give rise to plasmon absorptions that can give rise to strong colors. For example, for small gold nanoparticles with diameters around 13 nm, these absorptions give rise to materials that have a red appearance when the particles are isolated that shifts to blue when the particles are aggregated.

Quantification of the sensitivity in these devices may be performed by absorbance spectroscopy. The change in a peak and/or trough of the spectrum may be measured, for example, by addition, subtraction, multiplication, or division of the spectra, or by observation of a change in the distance between peaks and/or troughs of the spectra, a change in the shape of the spectra, and/or the like. In some cases, the change in signal may be determined using an analyzer that may compare the signals produced by the device before and after exposure to an analyte. In some cases, the signals may be further processed to determine the analyte. For example, the signal may be filtered, amplified, subject to Fourier transforms, decomposed using wavelet decomposition, and/or the like.

Devices of the invention may be fabricated using methods described herein, and/or in combination with other methods known to those of ordinary skill in the art. In some embodiments, methods of the invention may advantageously provide the ability to process materials which may otherwise be insoluble and/or difficult to process. For example, the method may allow for the formation of stable dispersions of nanostructures, such that the nanostructures are readily processible in solution. In some cases, the method may involve processing a mixture comprising a plurality of nanostructures (e.g., carbon nanotubes) and a polymer material, or precursor thereof, to form a sensor material as described herein. The mixture may be a solution, a suspension, a dispersion, or the like. In some cases, the polymer material may have a relatively high molecular weight. In some cases, a dispersion of nanostructures may be stable under ambient atmosphere, at room temperature, and/or for long periods of time (e.g., several weeks, months, or years).

In certain embodiments, the polymer material and carbon nanotubes are mixed with a fluid carrier to form a solution, suspension, dispersion, etc. That is, the polymer material and/or carbon nanotubes may, in some cases, be soluble in a fluid carrier. In some cases, the polymer material and/or carbon nanotubes are not soluble in the fluid carrier. The mixture may comprise any common fluid carrier (e.g., solvent) known to those of common skill in the art such as tetrahydrofuran, chloroform, and the like. In some cases, the solution may comprise more than one fluid carrier. In some cases, the mixture of the polymer material and the carbon nanotubes may be sonicated to facilitate formation of a dispersion. Other methods for the formation of nanostructure dispersions are described in International Pat. Apl. Serial No.: PCT/US2009/001396, filed Mar. 4, 2009, entitled, "Devices and Methods for Determination of Species Including Chemical Warfare Agents" and U.S. application Ser. No. 12/474,415, filed May 29, 2009, entitled, "Field Emission Devices Including Nanotubes or Other Nanoscale Articles," which are incorporated herein by reference in their entirety for all purposes.

The mixture may be processed by various methods, including spin-coating, drop-casting, spray-coating, ink jet printing, electrophoretic deposition, medium scale deposition using a doctor knife, continuous processes and the like. In some cases, the sensor material may be formed (e.g., deposited) on a substrate, including an electrode (e.g., interdigitated electrodes), an integrated device, an integrated circuit, or the like. In some embodiments, the sensor material may be formed on patterned electrode assemblies. The deposition of metal electrodes may also be performed using known methods, such as evaporation and sputter coating. Array devices for the discrimination of different types of radiation can be created by, for example, ink jet printing of suspensions comprising the nanostructures, polymer material, and/or any additives (e.g., nanoparticles) on circuitry. For distributed sensory arrays the low power requirements of the devices may be compatible with RFID methods. This versatility may allow for the economical manufacture of devices at any size and in various configurations.

Figure 12:
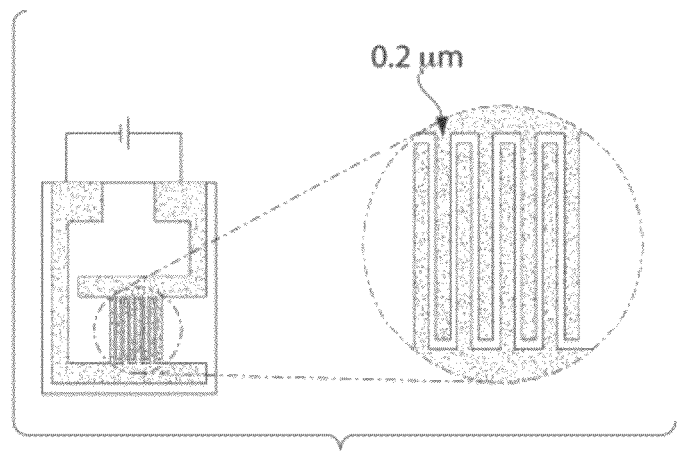
FIG. 12 provides a schematic representation of interdigitated electrodes.

In some embodiments, at least a portion of the sensor material (e.g., polymer material) may be used as an electron beam resist, allowing for the use of electron-beam lithography to create nano-circuits in the device. Using this approach, gaps between conductive regions that need to be activated to create increased or decreased conductance may be reduced. Interdigitated devices, as shown in FIG. 12, may include many small gaps, including submicron gaps, and may generate large signals. In cases where submicron gaps are utilized, the nanostructures may be selected to have dimensions compatible with the submicron gaps. For example, shortened carbon nanotubes may be employed. In addition, any shape for the conductive network may be utilized to allow different regions of a device to be addressed.

Figure 6:
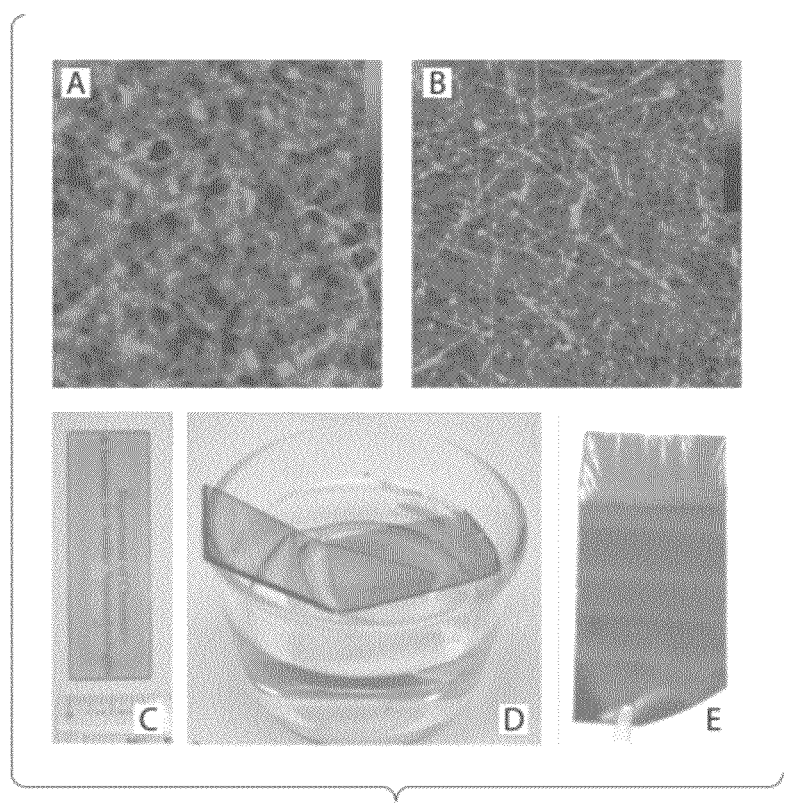
FIG. 6 shows atomic force microscopy (AFM) images of a single-walled carbon nanotube (SWCNT)/polymer thin film, (a) as cast and (b) after extraction of the polymer more clearly showing the SWCNT network; (c) an optical image of SWCNT/polymer film deposited on glass slides; (d) a freestanding SWCNT/polymer film floating on water surface; and (e) a SWCNT/polymer film transferred on silicon substrate.

In some embodiments, the sensor material may have high mechanical integrity and can be processed as free-standing films. For example, the sensor material may be removed from a surface by immersion in water, as shown in FIG. 6. The atomic force microscopy (AFM) images of FIG. 6 show a single-walled carbon nanotube (SWCNT)/polymer thin film, (a) as cast and (b) after extraction of the polymer more clearly showing the SWCNT network; (c) an optical image of SWCNT/polymer film deposited on glass slides; (d) a free-standing SWCNT/polymer film floating on water surface; and (e) a SWCNT/polymer film transferred on silicon substrate. An advantage of this method is that the materials can be placed on a diverse array of substrates, including plastics that may not be compatible with the solvents used in the initial fabrication.

In some cases, the mixture may be processed to form a thin film comprising the carbon nanotubes and the polymer material. A thin film may have a thickness between about 0.1 nm and about 100 um. For example, the thickness of the film may be less than about 100 um, less than about 50 um, less than about 25 um, less than about 10 um, less than about 5 um, less than about 1 um, less than about 500 nm, less than about 250 nm, less than about 100 nm, less than about 50 nm, less than about 25 nm, less than about 10 nm, less than about 5 nm, less than about 2 nm, less than about 1 nm, or in some cases, less than about 0.5 nm. The thickness of the film may or may not be uniform throughout the device. A thin film may be formed using processes such as spin-on methods, chemical vapor deposition, pulsed laser deposition, vacuum plasma spray, wet spray, sputtering, evaporation, or molecular beam epitaxy.

In some cases, device sensitivity may be increased by application of strain to the sensor material (e.g., in film form). For example, chemical crosslinks may be introduced into sensor materials with low glass transition temperatures post-casting to create an elastomeric film that undergo minimal or substantially no plastic flow over time. Application of mechanical stress to the films may result in the alignment of nanostructures and decrease the electrical resistance in the stretch direction. In some cases, a percolated SWCNT network may form in the stretching direction. Cleavage of the polymer matrix may allow for relaxation of the network and the SWCNTs orientation may commensurately relax and effectively break the circuit. In this scheme, a fuse that breaks in response to radiation is essentially formed.

Another method for creating strained systems, which can be applied to freestanding or surface confined films, may be to swell the crosslinked materials with another liquid. Both methods (e.g., swelling and mechanical stretching) may stress the polymer matrix, placing the polymer in a high-energy conformational state. However, mechanical stretching may result in a densification of the material and swelling fundamentally expands the matrix. In the swelling schemes, materials in which the unstressed compositions are conductive and have a percolative network of SWCNTs may be used. Swelling of the films may then disrupt the percolative network of SWCNTs and lower the conductance. Cleavage of the polymer chains may allow for relaxation of the network and re-establishment of connections between nanostructures (e.g. carbon nanotubes). A variety of fluids can be utilized, including materials with heavy atoms. In some embodiments, ionic liquids are used, as they typically do not evaporate over extended periods and allow for a diversity of counterions.

The application of strain may give additional intrinsic sensitivity to the devices as a result of the strain applied to the polymer chains. For example, with any radiation-induced chain cleavage there may be some unproductive events wherein the two reactive units generated by scission of a polymer chain can recombine. When the polymers are placed under stress, rapid relaxation to a lower energy conformation may prevent the recombination process. In some cases, cleavage of a few polymer chains can place strains on adjacent polymers. These strains can be so large that the adjacent polymers may fragment and cause further depolymerization (e.g., a cascade process).

The method may further comprise forming at least one electrode material, for example, on the surface of a substrate or in contact with the sensor material. In some cases, at least two electrode materials, or more, are formed on the surface of a substrate or in contact with the sensor material. The electrode materials, and other components of the device, may be formed at any time during the fabrication process to produce devices as described herein, or devices having an alternative arrangement. For example, the sensor material, electrode materials(s) (e.g., source electrode, drain electrode, gate electrode, etc.), and/or an insulating material may be fabricated in any order to produce a device as described herein. In some embodiments, the electrode material may be formed on a substrate prior to formation of the sensor material. In some embodiments, the electrode may be formed on the sensor material. The electrode material(s) may be deposited onto any component of the device using methods known in the art, such as electroplating.

In some embodiments, simple screening tests may be conducted to select appropriate sensor materials (e.g., carbon nanotubes, polymer material, etc.), additives, device configuration, set of conditions, etc., to suit a particular application. In some cases, a material or device may be screened to determine the sensitivity and/or stability of the material or device. In some cases, a material (and/or device) may be selected based on an ability to detect one or more types of radiation. For example, the ability of a device to detect ionizing radiation may be determined by comparing the signal (e.g., conductance) of the device prior to and following exposure to ionizing radiation. In another example, a device may be exposed to varying concentrations of ionizing radiation to determine the sensitivity of the device. As another example, a first device and a second device may be provided, wherein the second device comprises a different material (e.g., nanostructure, polymer material, additive, electrode material, etc.) and/or configuration (e.g., relative position of components, or additional component such as a gate electrode or insulating material, etc.) as compared to the first device. Signals produced by the first and second devices prior to and following exposure to ionizing radiation (e.g., percent change in signal upon exposure to ionizing radiation, baseline signal, time required for following exposure to the analyte for the signal to return to baseline, etc.) may then be compared to determine differences between the performance of first and second devices.

As described herein, a system comprising two or more devices may be fabricated, wherein each device comprises a first electrode, a second electrode and a sensor material comprising carbon nanotubes dispersed in a polymer material. In some cases, the individual devices of the system may be substantially identical. For example, the individual devices may be constructed to interact with the same form of ionizing radiation. In some cases, the individual devices of the system may be different, such that each individual device may selectively interact with a particular type of ionizing radiation. This may be accomplished, for example, by fabricating a plurality of devices, each comprising a sensor material and/or binding site responsive to a different type of ionizing radiation. For example, each individual device may be capable of interacting with a particular type of ionizing radiation, and may interact with other types of ionizing radiation to a different (e.g., lesser) extent. This may be useful in determining two or more different types of ionizing radiation present in a single sample.

Devices as described herein may have various device configurations, and may be selected to suit a particular application. For example, the sensor material may be fabricated such that a first and the second electrode are in electrochemical communication with the sensor material. "Electrochemical communication," as used herein, refers to materials that are in sufficient communication with each other, such that the transfer of electrons and/or protons and/or other charged moieties can occur between the two materials. For example, the first and second electrodes may not contact one another but may be in electrochemical communication with one another via the sensor material, such that upon application of a voltage between the first and second electrode, a current flows from the one electrode through the sensor material to the other electrode. In some instances, the first electrode may be a source electrode and the second electrode may be a drain electrode. In some instances, the sensor material is placed on a substrate. Non-limiting embodiments of devices are described more fully below.

As used herein, the term "nanostructure" refers to any chemical structure having at least one dimension on the order of nanometers. In some cases, the nanostructure has an elongated chemical structure having a diameter on the order of nanometers and a length on the order of microns to millimeters, resulting in an aspect ratio greater than 10, 100, 1000, 10,000, or greater. In some cases, the nanostructure may have a diameter less than 1 μm, less than 100 nm, 50 nm, less than 25 nm, less than 10 nm, or, in some cases, less than 1 nm. The nanostructure may have a cylindrical or pseudo-cylindrical shape. In some cases, the nanostructure may be a nanotube, such as a carbon nanotube. In some cases, the nanostructure is a nanorod, nanowire, or nanoribbon. In some cases, the nanostructure is a nanoparticle.

As used herein, the term "carbon nanotube" is given its ordinary meaning in the art and refers to a substantially cylindrical molecule, in some cases, comprising a fused network of six-membered aromatic rings. In some cases, carbon nanotubes may resemble a sheet of graphite rolled up into a seamless cylindrical structure. It should be understood that the carbon nanotube may also comprise rings other than six-membered rings. Typically, at least one end of the carbon nanotube may be capped, i.e., with a curved or nonplanar aromatic group. Carbon nanotubes may have a diameter of the order of nanometers and a length on the order of millimeters, resulting in an aspect ratio greater than about 100, greater than about 1000, greater than about 10,000, or greater. The term "carbon nanotube" includes single-walled nanotubes (SWCNTs), multi-walled nanotubes (MWCNTs) (e.g., concentric carbon nanotubes), inorganic derivatives thereof, and the like. In some embodiments, the carbon nanotube is a single-walled carbon nanotube. In some cases, the carbon nanotube is a multi-walled carbon nanotube (e.g., a double-walled carbon nanotube).

The carbon nanotubes may be functionalized or substituted with a wide range of functional groups. Examples of functional groups that carbon nanotubes may be substituted with include peptides, proteins, DNA, RNA, peptide nucleic acids (PNA), metal complexes, ligands for metals, ligands for proteins, antibodies, polarizable aromatics, crown ethers, hydroxylamines, polymers, initiators for polymerizations, liquid crystals, fluorocarbons, synthetic receptors, and the like. The properties of the nanotubes may also be tailored based on the substitution of the fused, aromatic network. Those skilled in the art would recognize what types of functional groups would afford a particular, desired property, such as increased solubility, or the ability to determine an analyte. In some embodiments, the substituted carbon nanotube comprises a binding site. In some embodiments, substituted carbon nanotubes may be readily processed in a fluid carrier. That is, dispersions of substituted carbon nanotubes may be formed.

Substituted carbon nanotubes may be synthesized using various methods, including those described in Zhang et al., J. Am. Chem. Soc. 2007, 129(25), 7714; International Publication No. WO2008/1337791, which are incorporated herein by reference in their entirety for all purposes.

Polymers or polymer materials, as used herein, refer to extended molecular structures comprising a backbone (e.g., non-conjugated backbone, conjugated backbone) which optionally contain pendant side groups, where "backbone" refers to the longest continuous bond pathway of the polymer. In some embodiments, the polymer is substantially non-conjugated or has a non-conjugated backbone. In some embodiments, at least a portion of the polymer is conjugated, i.e. the polymer has at least one portion along which electron density or electronic charge can be conducted, where the electronic charge is referred to as being "delocalized." A polymer may be "pi-conjugated," where atoms of the backbone include p-orbitals participating in conjugation and have sufficient overlap with adjacent conjugated p-orbitals. It should be understood that other types of conjugated polymers may be used, such as sigma-conjugated polymers.

In one embodiment, the polymer is selected from the group consisting of poly(olefin sulfone)s or polyaldehydes.

The polymer can be a homo-polymer or a co-polymer such as a random co-polymer or a block co-polymer. In one embodiment, the polymer is a block co-polymer. An advantageous feature of block co-polymers is that they may mimic a multi-layer structure, wherein each block may be designed to have different band gap components and, by nature of the chemical structure of a block co-polymer, each band gap component is segregated. As described herein, the band gap and/or selectivity for particular analytes can be achieved by modification or incorporation of different polymer types. The polymer compositions can vary continuously to give a tapered block structure and the polymers can be synthesized by either step growth or chain growth methods.

The number average molecular weight of the polymer may be selected to suit a particular application. As used herein, the term "number average molecular weight ($M_n$)" is given its ordinary meaning in the art and refers to the total weight of the polymer molecules in a sample, divided by the total number of polymer molecules in a sample. Those of ordinary skill in the art will be able to select methods for determining the number average molecular weight of a polymer, for example, gel permeation chromatography (GPC). In some cases, the GPC may be calibrated vs. polystyrene standards. In some cases, the number average molecular weight of the polymer is at least about 10,000, at least about 20,000, at least about 25,000, at least about 35,000, at least about 50,000, at least about 70,000, at least about 75,000, at least about 100,000, at least about 110,000, at least about 125,000, or greater.

In some embodiments, various components of the device are formed on a substrate. The substrate can comprise a wide variety of materials, as will be appreciated by those in the art, including printed circuit board (PCB) materials. Suitable substrates include, but are not limited to, fiberglass, Teflon, ceramics, glass, silicon, mica, plastic (including acrylics, polystyrene and copolymers of styrene and other materials, polypropylene, polyethylene, polybutylene, polycarbonate, polyurethanes, and derivatives thereof, etc.), GETEK (a blend of polypropylene oxide and fiberglass), and the like. The device may also comprise an insulating material. The insulating material may be arranged between the sensor material and one or more electrodes (e.g., gate electrode) and/or the substrate. In some cases, the insulating material may reduce the mobile ion damage and minimize drift in gas sensor devices and/or may improve physical adhesion of the sensor material to the underlying material or substrate. Examples of suitable insulating materials include, but are not limited to, polysilicate glass, silicon dioxide, silicon nitride, and the like.

As used herein, the term "electrode" or "electrode material" refers to a composition, which, when connected to an electronic device, is able to sense a current or charge and convert it to a signal. An electrode may be comprised of a conductive material or combination of materials such as, for example, metals. Non-limiting examples of suitable metals include gold, copper, silver, platinum, nickel, cadmium, tin, and the like. The electrodes may also be any other metals and/or non-metals known to those of ordinary skill in the art as conductive (e.g. ceramics). The electrodes may be deposited on a surface via vacuum deposition processes (e.g., sputtering and evaporation) or solution deposition (e.g., electroplating or electroless processes). In a specific example, gold electrodes are deposited by sputter-coating.

As used herein, the term "environment" refers to any medium (e.g., solid, liquid, gas) that can be evaluated in accordance with the invention including, such as air or other vapor samples, soil, water, a biological sample, etc. An "environment suspected of containing" a particular component means a sample with respect to which the content of the component is unknown. For example, a gas environment where one or more forms of ionizing radiation may be present, but not known to have the ionizing radiation, defines a sample suspected of containing ionizing radiation.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure. In some embodiments, an alkyl group may be a lower alkyl group, wherein a lower alkyl group comprises 10 or fewer carbon atoms in its backbone (e.g., $C_1$-$C_{10}$ for straight chain lower alkyls).

The term "heteroalkyl" is given its ordinary meaning in the art and refers to alkyl groups as described herein in which one or more atoms is a heteroatom (e.g., oxygen, nitrogen, sulfur, and the like). Examples of heteroalkyl groups include, but are not limited to, alkoxy, poly(ethylene glycol)-, alkyl-substituted amino, tetrahydrofuranyl, piperidinyl, morpholinyl, etc.

The term "aryl" is given its ordinary meaning in the art and refers to single-ring, multiple-ring, or multiple-fused-ring aromatic groups comprising, for example, 5-, 6- and 7-membered ring aromatic groups, all optionally substituted. In some cases, the at least one ring in the aryl group is aromatic. The term "heteroaryl" is given its ordinary meaning in the art and refers to aryl groups as described herein in which one or more atoms is a heteroatom (e.g., oxygen, nitrogen, sulfur, and the like). Examples of aryl and heteroaryl groups include, but are not limited to, phenyl, pyrrolyl, furanyl, thiophenyl, imidazolyl, oxazolyl, thiazolyl, triazolyl, pyrazolyl, pyridinyl, pyrazinyl, pyridazinyl and pyrimidinyl, and the like. It should be understood that, when aryl and heteroaryl groups are used as ligands coordinating a metal center, the aryl and heteroaryl groups may have sufficient ionic character to coordinate the metal center.

The terms "carboxyl group," "carbonyl group," and "acyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." The term "carboxylate" refers to an anionic carboxyl group. In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

As used herein, the term "halogen" or "halide" designates —F, —Cl, —Br, or —I.

The term "alkoxy" refers to the group, —O-alkyl.
The term "aryloxy" refers to the group, —O-aryl.
The term "acyloxy" refers to the group, —O-acyl.
The term "arylalkyl", as used herein, refers to an alkyl group substituted with an aryl group.

The terms "amine" and "amino" are art-recognized and refer to both unsubstituted and substituted amines, e.g., a moiety that can be represented by the general formula: N(R')(R")(R''') wherein R', R", and R''' each independently represent a group permitted by the rules of valence.

As used herein, the term "substituted" is contemplated to include all permissible substituents of organic compounds, "permissible" being in the context of the chemical rules of valence known to those of ordinary skill in the art. In some cases, "substituted" may generally refer to replacement of a hydrogen atom with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" group must still comprise the phenyl moiety and cannot be modified by substitution, in this definition, to become, e.g., a cyclohexyl group. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For example, a substituted alkyl group may be $CF_3$. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, arylalkyl, cyclic alkyl, heterocycloalkyl, hydroxy, alkoxy, aryloxy, perhaloalkoxy, arylalkoxy, heteroaryl, heteroaryloxy, heteroarylalkyl, heteroarylalkoxy, azido, amino, halogen, alkylthio, oxo, acylalkyl, carboxy esters, carboxyl, -carboxamido, nitro, acyloxy, aminoalkyl, alkylaminoaryl, alkylaryl, alkylaminoalkyl, alkoxyaryl, arylamino, arylalkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

EXAMPLES AND EMBODIMENTS

Unless otherwise noted, the reactions described in the Examples were performed under an oxygen-free atmosphere of argon. Graduated flasks were used for polymerization reactions with condensed sulfur dioxide. Anhydrous solvents were obtained using a solvent purification solvent (Innovative Technologies). All other chemicals were of reagent grade from Sigma-Aldrich and were used as received, except for sulfur dioxide, which was purchased from Airgas, and triphenylbismuthine, which was purchased from Alfa. Cuprous Bromide was purified as described somewhere else.[1] Multi-walled carbon nanotubes were donated by Bayer, AG (Baytubes 150 P, >95% purity).

NMR spectra were obtained on a Bruker Avance (400 MHz). NMR chemical shifts are given in ppm referenced to $CHCl_3/TMS$ (7.24 ppm for $^1H$, 77.24 ppm for $^{13}C$), unless otherwise noted. High-resolution mass spectra (HRMS) were obtained on a Bruker Daltonics APEXII 3 Tesla Fourier Transform Mass Spectrometer at the MIT Department of Chemistry Instrumentation Facility (DCIF). Fourier Transform infrared (FT-IR) spectroscopy was performed on a Perkin-Elmer model 2000 FT-IR spectrophotometer using the Spectrum v. 2.00 software package. Polymer molecular weights were determined at room temperature on a HP series 1100 GPC system in THF at 1.0 mL/min (1 mg/mL sample concentrations), approximate molecular weights were estimated using a polystyrene calibration standard. Amperometric measurements were performed with an AUTOLAB PGSTAT 20 potentiostat (Eco Chemie) at constant potential (1 V). Gold electrodes were deposited using a SC7620 Sputter Coater from Quorum Technologies. The decaying element from the core of a nuclear reactor was used for the high dose gamma ray source at the gamma irradiation facility from the nuclear reactor at MIT, and a Gammacell irradiator Gammacell 40 with a $^{137}Cs$ source (Model C-161, Type 8) was used for the lower radiation doses. Optical Microscopy pictures were obtained using a Leica DMRXP optical microscope. SEM images were obtained using a JEOL JSM 6060 Scanning Electron Microscope. Samples for SEM were coated with a Sputterer with a Au/Pd target to prevent radiation damage.

Devices were fabricated by drop casting on previously cleaned microscope slides, using a sonicated THF solution containing both the POS and the MWCNTs Films were dried in a vacuum oven prior to electrochemical measurements. Amperometric measurements were performed on 6 devices with the same composition for every data point: 3 of the devices were exposed to radiation, and 3 of them were not. Each amperometric measurement was performed three times over 30 s for every device, and averaged before and after irradiation. The variation in the current intensity produced was compared between irradiated samples and non-irradiated samples.

Example 1

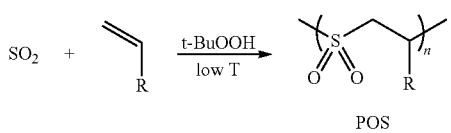

POS

The following describes a general method for POS synthesis. A typical Poly(Olefin Sulfone) synthesis was carried out following literature procedures. In general, sulfur dioxide (6 mL) was condensed into a graduated vessel at −78° C. The reaction vessel was then transferred into a −45° C. bath. Olefin monomers were added to the reaction mixture in the desired ratio, and the solution was stirred for 5 minutes. Initiator for the polymerization (tert-Butyl hydroperoxide in decane, solution 5.0-6.0M, 5-10 mol % relative to total amount of olefin) was added, and the mixture was stirred at −45° C. for 2 h. The polymerization was stopped by pouring the reaction mixture into MeOH. The resulting white powder was redissolved in $CHCl_3$ and reprecipitated from MeOH, then washed with MeOH. The white solid obtained was dried under vacuum.

Example 2

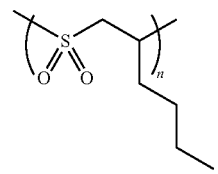

Figure 20A:
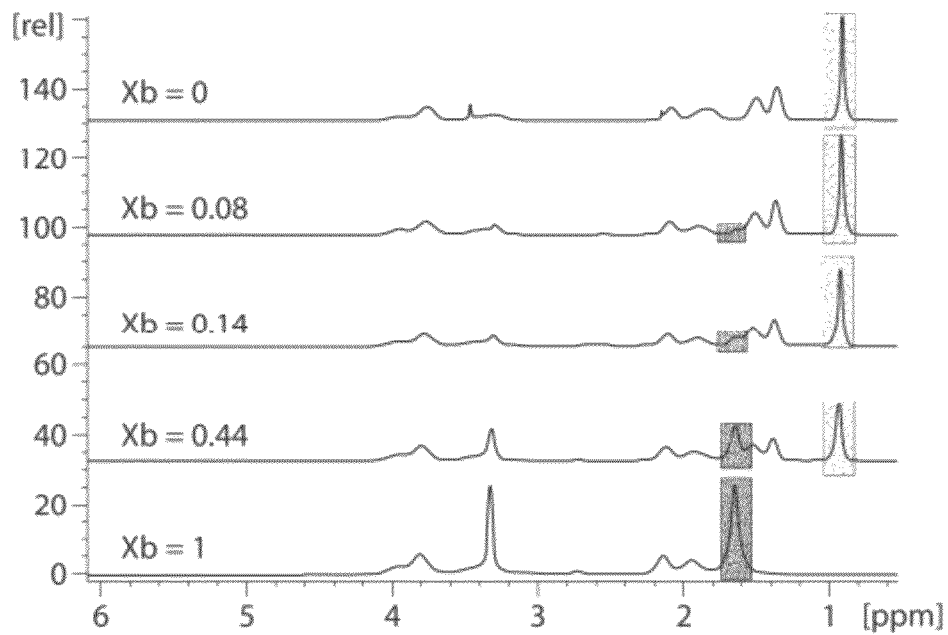
FIG. 20 shows (a) $^1$H-NMR spectra for POS with different ratios of Xa, Xb (Xa+Xb=1) and (b) corresponding IR spectra, for polymer 2.
Figure 20B:
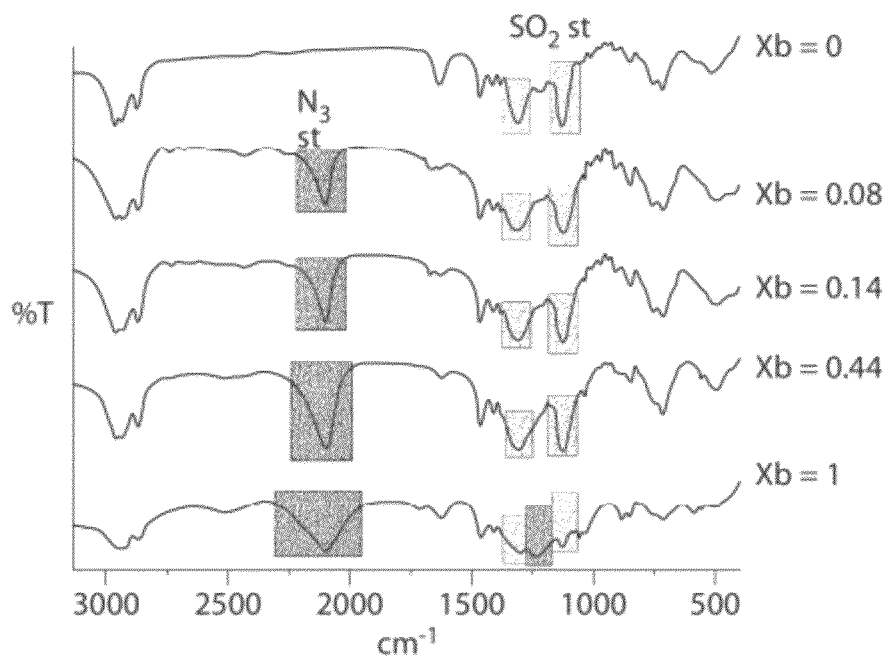

Poly(1-hexene sulfone) 1 was synthesized using the method described in Example 1. 98% yield, $\delta_H$ ($CDCl_3$) 0.9 (3H, br t), 1.3-1.4 (2H, br), 1.4-1.6 (2H, br), 1.8-2.0 (1H, br), 2.0-2.2 (1H, br), 3.2-3.5 (1H, br), 3.7-4.1 (2H, br); $\delta_C$ ($CDCl_3$) 13.92. 22.67, 28.12, 28.46, 50.26, 57.34; IR (FIG. 20B, black curve) 2961, 2874, 1309, 1130, 715; GPC $M_n$=102K, $M_w$=367K, D=1.97.

Example 3

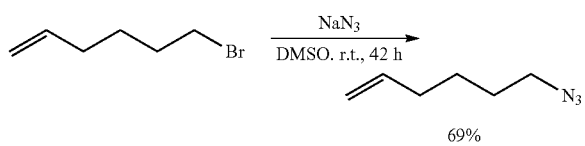

The following example describes the synthesis of 6-azido-1-hexene. To a solution of 6-bromo-1-hexene (1 ml, 7.5 mmol) in DMSO (20 ml) under argon was added sodium azide (1 g, 15.4 mmol), and the solution was stirred for 42 h at room temperature. A 1:1 mixture of $H_2O$/diethyl ether was added to the reaction mixture, and the aqueous phase was extracted three times with 20 mL $Et_2O$. The combined organic phases were washed twice with 20 mL $H_2O$, 20 ml brine, and dried over $MgSO_4$. After removal of the solvent under reduced pressure, a colorless oil was obtained (652 mg, 69%). $\delta_H$ ($CDCl_3$) 1.4 (2H, m), 1.6 (2H, m), 2.1 (2H, m), 3.2 (2H, t, J=6.8 Hz), 4.9 (2H, m), 5.8 (1H, ddt, 6.7, 10.2, 16.9 Hz); $\delta_C$ ($CDCl_3$) 26.10, 28.44, 33.38, 51.51, 115.19, 138.35.

Example 4

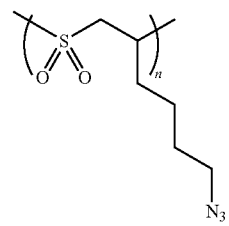

Poly(6-azido-1-hexene sulfone) 2 (a/(a+b)=0) was synthesized using the method described in Example 1. 96% yield; $\delta_H$ ($CDCl_3$) 1.5-1.8 (4H, br), 1.8-2.1 (1H, br), 2.1-2.3 (1H, br), 3.3-3.6 (3H, br), 3.7-4.1 (2H, br); $\delta_C$ (CDCl$_3$) 23.19, 28.18, 28.58, 49.78, 51.00, 57.00; IR (FIG. 20B, bottom curve) 2942, 2098, 1299, 1234, 1128; GPC $M_n$=2.9K, $M_w$=5.0K, D=1.71.

Example 5

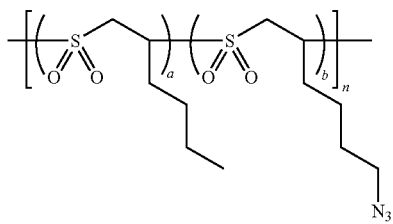

Poly(1-hexene 6-azido-1-hexene sulfone), 2 (a/(a+b)≠0) was synthesized using the method described in Example 1. $\delta_H$ (CDCl$_3$): mixture of signals at the same positions as for 1 and 2. $X_a$, $X_b$ were determined by comparison of the integration of the signal at 0.9 ppm (3H from repeat unit a, highlighted in FIG. 20A) and at 1.5-1.8 ppm (4H from repeat unit b, highlighted in FIG. 20A)). Corresponding IR Spectra are shown on FIG. 20B. For polymer 2 where $X_a$=0.56, $X_b$=0.44, $M_n$=4.7K, $M_w$=9.3K, D=1.99.

Example 6

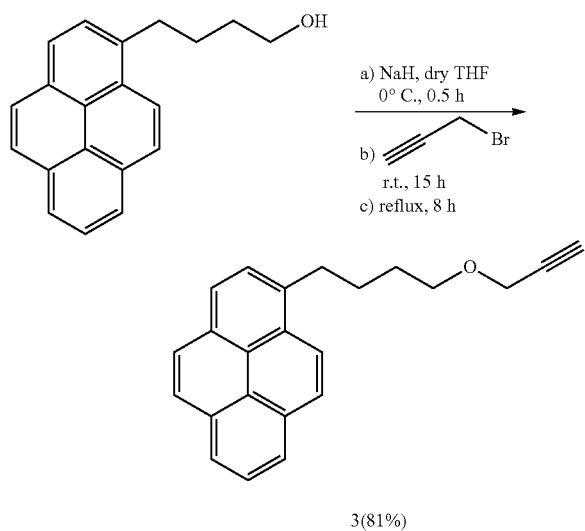

3(81%)

Propargyl pyrenebutyl ether, 3, was synthesized according to the following method. To a solution of 1-pyrenebutanol (1 g, 3.6 mmol) in anhydrous THF (15 ml) was added NaH (160 mg, 6.7 mmol) at 0° C. The solution was stirred at 0° C. for 30 min, and propargyl bromide (80% in toluene, 880 mg, 7.4 mmol) was added. The reaction was stirred at 0° C. in the dark for 30 min, and then let go to room temperature. After stirring for 15 h, the reaction was refluxed for 8 h, after which ethyl acetate (10 mL) and water (10 mL) were added. The aqueous phase was extracted twice with 10 mL ethyl acetate. The combined organic phases were washed twice with 15 mL H$_2$O, and then twice with 15 ml brine, and dried over MgSO$_4$.

After removal of the solvent under vacuum, the crude was purified by column chromatography using toluene as the eluent to give 3 as a pale yellow powder (911 mg, 81%). $\delta_H$ (CDCl$_3$) 1.8 (2H, m), 1.9 (2H, m), 2.6 (1H, t, J=2.4 Hz), 3.4 (2H, t, J=8 Hz), 3.6 (2H, t, J=6.4 Hz), 4.2 (2H, d, J=2.4 Hz), 7.8-8.3 (9H, m); $\delta_C$ (CDCl$_3$) 26.19, 29.49, 33.06, 58.00, 69.83, 74.35, 80.15, 123.33, 124.59, 124.71, 124.74, 124.94, 124.96, 125.68, 126.46, 127.07, 127.08, 127.45, 128.50, 129.67, 130.82, 131.34, 135.67; IR 3294, 3040.51, 2933, 2860, 2116, 1102, 844 cm$^{-1}$; m/z (HR-MS) found (M+H)$^+$ 313.1620, theoretical 313.16.

Example 7

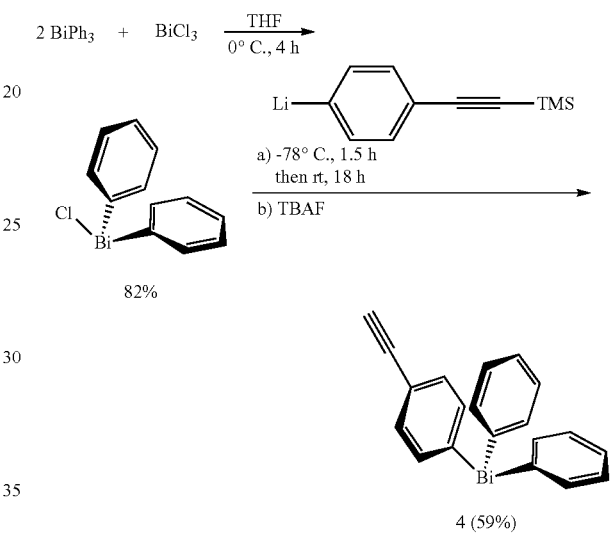

4 (59%)

The following example describes the synthesis of (4-ethynylphenyl)diphenyl-bismuthine, 4. Chlorodiphenylbismuthine was synthesized from triphenylbismuthine and bismuth trichloride via a ligand redistribution reaction as described in the literature. To a solution of (4-bromophenylethynyl)trimethylsilane (640 mg, 2.5 mmol) in anhydrous THF (26 mL) at −78° C. was added butyl lithium (1.6 mL solution in THF, 2.6 mmol) and stirred for 1 h. Chlorodiphenylbismuthine (1 g, 2.5 mmol) dispersed in 13 mL anhydrous THF was added to the reaction mixture, and stirred at −78° C. for 1.5 h. The reaction was let warm up to room temperature, and stir for 14 h, after which TBAF (3.8 mL in THF solution 1.0 M, 3.8 mmol) was added to the reaction mixture. After 4 h of stirring at room temperature, the solvent was removed under vacuum, and the residue was purified by column chromatography using hexanes/ethyl acetate 19:1 as the eluent. 4 was obtained as a colorless oil (685 mg, 59%). $\delta_H$ (THF-d$^8$) 3.6 (1H, s), 7.2-7.8 (14H, m); $\delta_C$ (THF-d$^8$) 79.48, 84.72, 115.38, 122.70, 128.68, 131.44, 134.47, 138.46, 158.59, 158.63 (the signals for the quaternary carbons directly bound to bismuth are very weak, as reported in previous compounds); IR 3288, 3058, 2924, 2106, 1570, 1474, 1428, 997, 817, 726, 695, 657, 533, 515, 446 cm$^{-1}$; m/z=386 (M$^+$-C$_6$H$_5$), 363 (M$^+$-C$_8$H$_5$), 310 (M$^+$-2C$_6$H$_5$), 286 (M$^+$-C$_6$H$_5$, C$_8$H$_5$), 209 (Bi$^+$=M$^+$-2C$_6$H$_5$, C$_8$H$_5$).

Example 8

The following example describes conditions for the click-chemistry post-polymerization reaction. On a typical synthesis of polymer families 5, 6, using standard Schlenk techniques, the alkynyl coupling partner (1 mmol) was dissolved in dry DMF (15 mL). Azide-containing POS (1 eq of azide-containing repeat unit) dissolved in 5 mL of anhydrous DMF was added to the reaction mixture. CuBr (14.3 mg, 0.1 mmol) and sodium ascorbate (29.7 mg, 0.15 mmol) dispersed in 5 mL anhydrous DMF were added to the reaction mixture, then addition of N,N-diisopropylethylamine (17 µl, 0.1 mmol) followed. The mixture was stirred at room temperature for 24 h, after which the solvent was removed under vacuum. The polymer was redissolved in THF, reprecipitated from MeOH, and washed with copious amounts of saturated aqueous solution of $NH_4Cl$. After washing with $H_2O$, MeOH, the resulting white solid was dried under vacuum.

Example 9

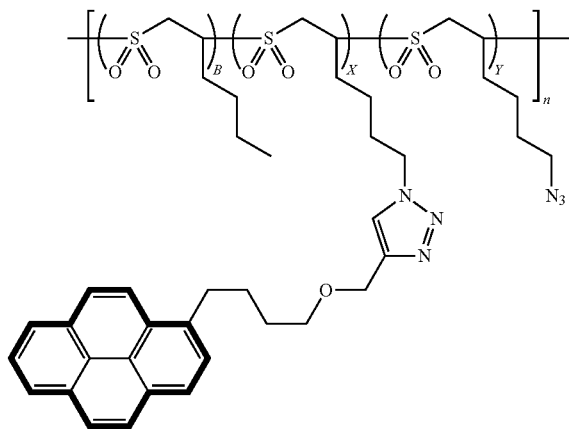

Polymer 5 (24 mol % Pyr) was synthesized according to the method described in Example 8. Mol % determined by $^1$H-NMR, comparing the relative ratio of the broad signal between $\delta_H$ 7.8-8.2 (9H, pyrene moiety), and 0.9 (3H, methyl group of hexane repeat unit); $M_n$=4.9K, $M_w$=7.2K, D=1.46.

Example 10

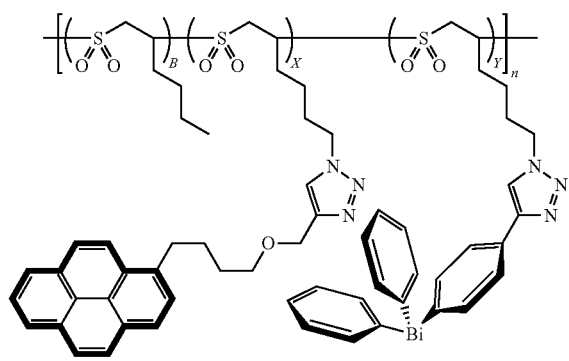

Polymer 6 (24 mol % Pyr, 20 mol % Bi) was synthesized according to the method described in Example 8. $M_n$=6.7K, $M_w$=7.5K, D=1.11.

Figure 21:
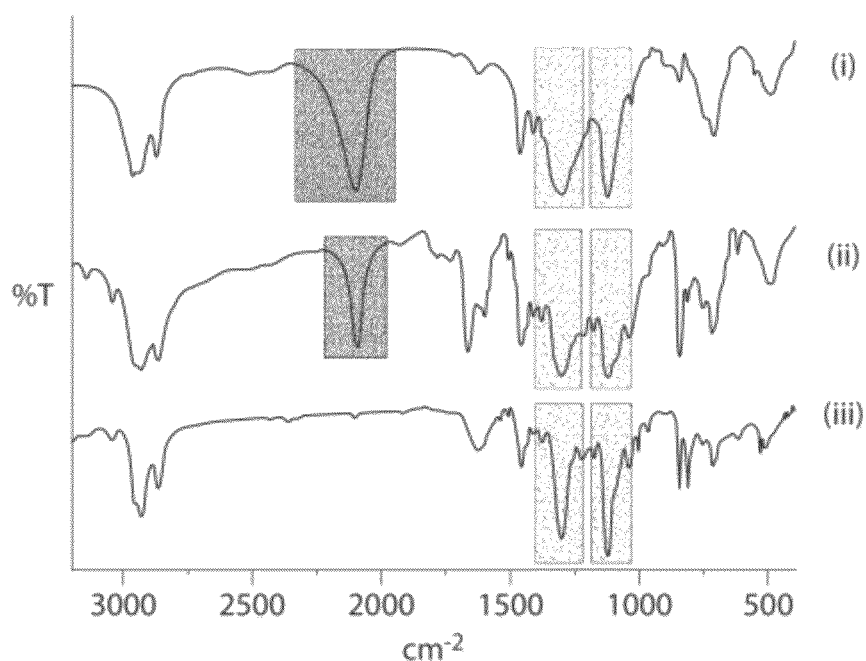
FIG. 21 shows IR Spectra of POS with different degrees of functionalization, including (i) polymer 2, with 44 mol % of azide-containing repeat unit ($X_b$=0.44); (ii) polymer 5, with 24 mol % pyrene containing repeat unit, 20 mol % repeat unit containing azide groups; and (iii) polymer 6, with 24 mol % pyrene containing repeat unit, 20 mol % bismuth containing repeat unit.

FIG. 21 shows IR Spectra of POS with different degrees of functionalization, including (i) polymer 2 (Example 5), with 44 mol % of azide-containing repeat unit ($X_b$=0.44); (ii) polymer 5 (Example 9), with 24 mol % pyrene containing repeat unit, 20 mol % repeat unit containing azide groups; and (iii) polymer 6 (Example 10), with 24 mol % pyrene containing repeat unit, 20 mol % bismuth containing repeat unit.

Example 11

Figure 3:
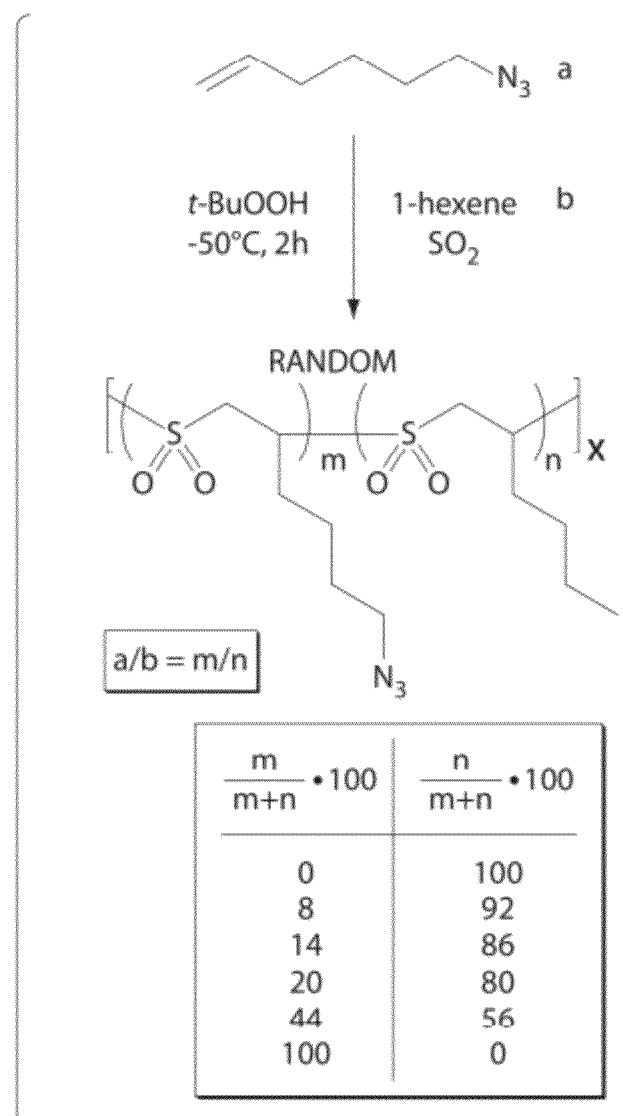
FIG. 3 shows an example of the synthesis of azide-containing poly(olefin sulfone)s.

In the following example, devices comprising functionalized polymers were designed and fabricated. Poly(1-hexene sulfone) 1, which degrades in the presence of ionizing radiation (e.g., high energy electrons, gamma rays) and is used as an electron beam resist, was used as the polymer matrix. In order to achieve good dispersions of nanotubes (e.g., MWCNTs), good levels of sensitivity, and improved gamma ray absorption, functional POSs were synthesized using "click" chemistry. Azide-containing olefins were synthesized and successfully incorporated into the main chains of the POSs. As shown in FIG. 3, copolymerization of 6-azido-1-hexene with $SO_2$ and 1-hexene afforded a family of random monomodal terpolymers, polymer 2, in which the ratio of incorporation of olefin to azido-olefin (a/b) was identical to the feed ratio (A/B) (see FIG. 18, ideal azeotropic copolymerization). This allowed for substantial control over the loading of azide functionalities on the side chain of the polymer. Huisgen 1,3-dipolar cycloaddition with alkynyl molecules provided the desired functionality to our POSs.

Figure 4B:
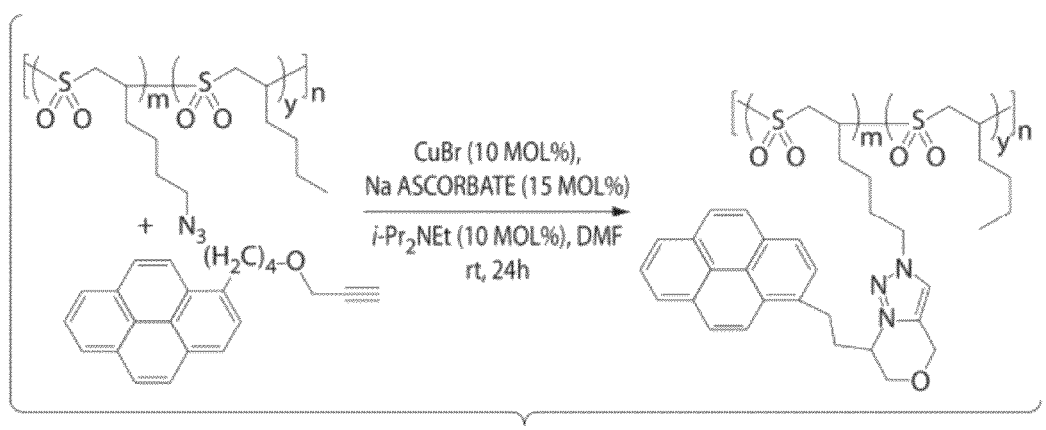
FIG. 4B shows the post-polymerization modification of a poly(olefin sulfone) with pyrene groups using "click" chemistry.
Figure 4C:
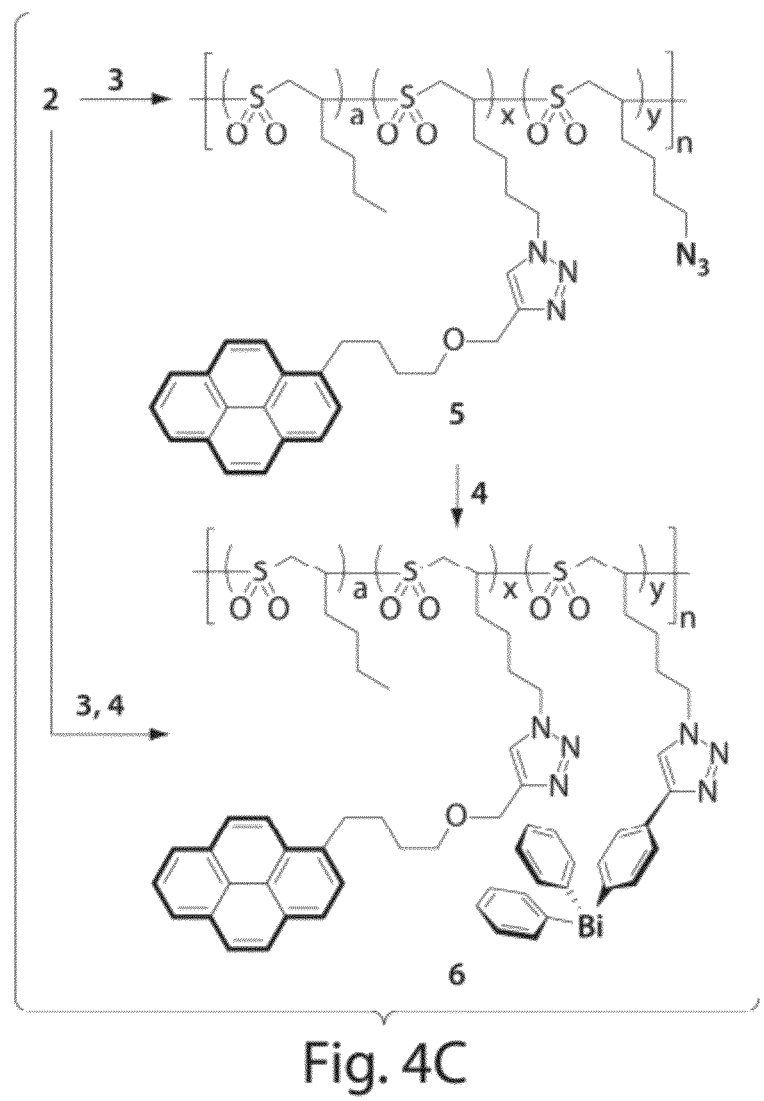
FIG. 4C shows the post-polymerization modification of a poly(olefin sulfone) with a bismuth-containing group using "click" chemistry.

The azide-containing polymers were further functionalized via click chemistry, using the alkyne-containing species shown in FIG. 4A. To improve the dispersion capabilities of MWCNTs, pyrene groups were attached to the side chains of the POSs to increase pi-pi stacking interactions with the nanostructures (e.g., carbon nanotubes), while leaving the electronic structure of the nanostructures intact. Using click-chemistry, pyrene 3 was incorporated into the POS. (FIG. 4B). This resulted in improved interaction between MWCNTs and POSs, and consequentially, less phase separation. As shown in FIG. 4C, stepwise or one-pot "click-chemistry" reactions of polymer 2 with pyrene derivative 3 and complex 4 yielded polymer families 5 and 6, the latter incorporating both pyrene and bismuth functionalities. The resulting polymers, 5 and 6, were characterized by GPC, $^1$H-NMR and IR. The presence of Bi in 6 was confirmed by XPS.

Improved MWCNTs dispersions were created by incorporation of pyrene into the POS materials utilizing addition reactions to pendant azides. Microscopy studies revealed improved dispersions and an increase in the device sensitivity was also observed.

Example 12

In this example, a device was produced from dispersions of poly(1-hexene sulfone) and commercially purified MWCNTs. Thin films of MWCNT/POS were deposited on a microscope slide by drop casting from a THF solution and gold electrodes were deposited via sputter coating with a spacing of 1.5 mm between electrodes.

Figure 19:
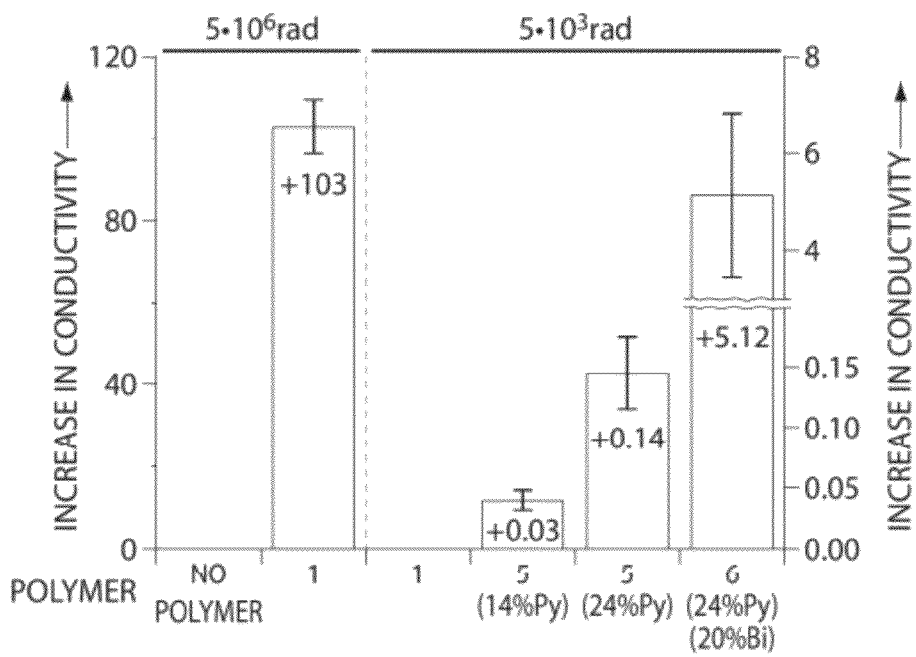
FIG. 19 shows a plot of the increase in conductivity for a series of POS/MWCNT composites, upon exposure to gamma rays.

FIG. 19 shows the increase in conductivity (y axis) of irradiated devices fabricated using the specified polymer (x axis) and MWCNTs. (Error bars=standard deviation.) Two radiation doses were used, $5·10^6$ rad and $5·10^3$ rad. Irradiation of devices composed of a blend of poly(1-hexene sulfone) 1 with multi-walled carbon nanotubes (MWCNT) with high doses of gamma radiation ($5·10^6$ rad) yielded an increase in the conductivity of up to 100 fold as compared to a non-irradiated reference of the same composition.

To test the dynamic range of the detectors, a lower dose of 5·10³ rad was employed, and devices composed of polymer1/MWCNT also showed a detectable increase in the conductivity as compared to a non-irradiated reference. However, the conductivity was at the lower detection limit of our amperometer, and devices did not show a determinable response when exposed to lower doses. Without wishing to be bound by theory, the low sensitivity can be attributed to poor initial dispersion of CNTs in the polymer as revealed by optical microscopy, and to the low gamma ray cross-sections of the elements that compose the POS. These problems can be addressed by using polymers 5 or 6 instead of polymer 1 for polymer fabrication.

When devices fabricated using functional POSs 5 and 6 were exposed to gamma radiation, a more pronounced increase in conductivity was obtained as compared to devices with the unfunctionalized equivalent poly(1-hexene sulfone), 1. An increase in the initial homogeneity of the system also improved the performance of the devices: if the response of 5 (14 mol % repeat unit x) and 5 (24 mol % repeat unit x) are compared to the same dose of radiation (5·10³ rad), the signal goes from barely detectable to an increase of about 14%. Incorporation of Bi to increase the opacity of the system towards gamma rays proved to be an even more effective strategy for increasing device response towards radiation: a 5.12 fold increase in the conductivity was detected when using polymer 6 for device fabrication.

Figure 22:
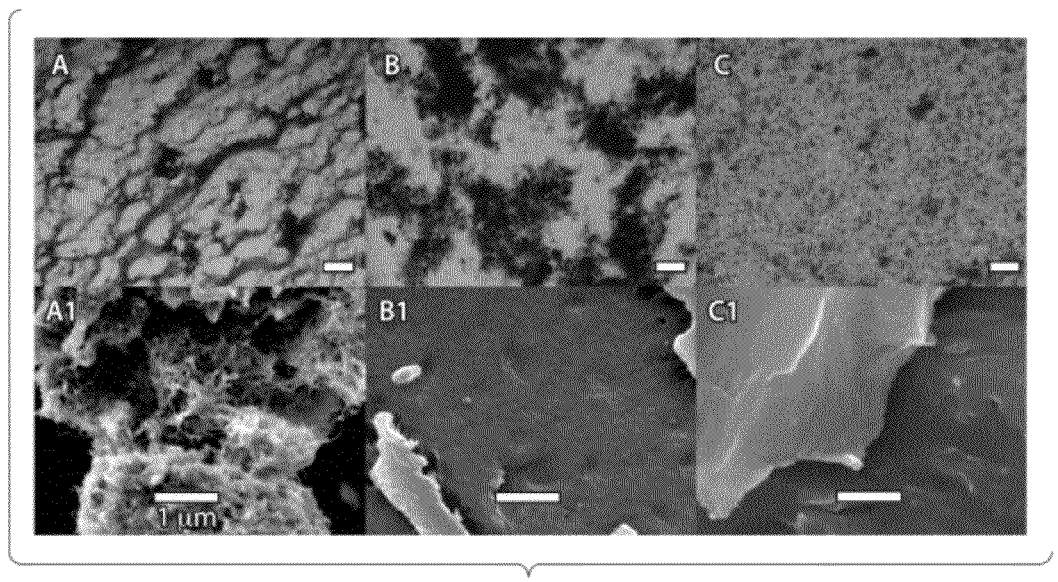
FIG. 22 shows images of films containing (A-A1) multi-walled carbon nanotubes (MWCNTs), (B-B1) polymer 1/MWCNT, and (C-C1) polymer 5 (24 mol % Pyrene)/MWCNT.

Degradation or depolymerization of the POS material was confirmed by analyzing the molecular weights before and after radiation exposure by Gel Permeation Chromatography (GPC), and CNT aggregation could be observed via optical microscopy. FIG. 22 shows images of films containing (a) multi-walled carbon nanotubes (MWCNTs), (b) polymer 1/MWCNT, and (c) polymer 5 (24 mol % Pyrene)/MWCNT. Optical Microscopy (A-C, 40×, bright field mode, scale bar 20 μm) and SEM (A1-C1, 23000×, 15 kV, SEI detector, no tilt, scale bar 1 μm) images of films composed of bare MWCNT (A, A1), polymer 1/MWCNT (B, B1), polymer 5 (24 mol % Pyrene)/MWCNT (C, C1). The optical microscopy pictures reveal how the degree of aggregation of the MWCNT decreased with increasing content of pyrene in the side chains of the POS (from FIG. 22B to FIG. 22 C, clear areas correspond to regions with transparent POS and MWCNT dispersed in aggregates too small to absorb visible light). The SEM pictures show that continuous films were formed when using a POS together with the MWCNT for film deposition.

Figure 23:
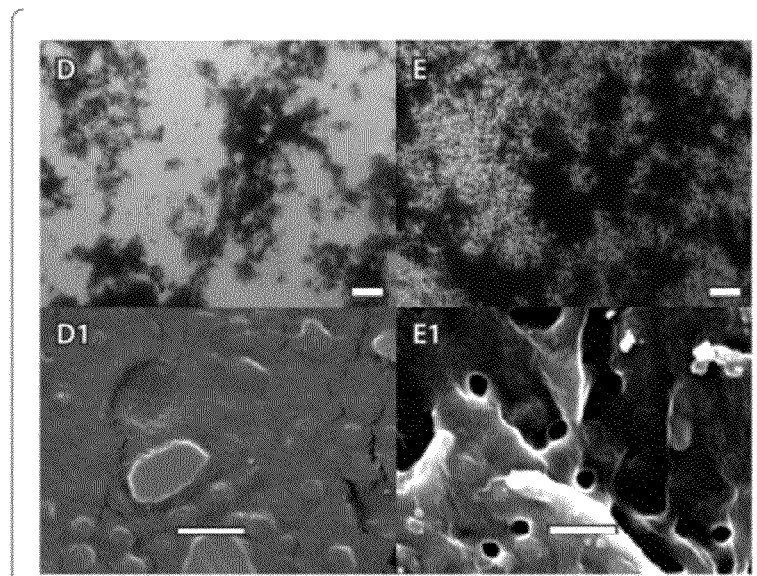
FIG. 23 shows images of films containing polymer 1/MWCNT (D-D1) before irradiation and (E-E1) after irradiation with a high dose of radiation.

FIG. 23 shows images of films containing polymer 1/MWCNT (d) before irradiation and (e) after irradiation with a high dose of radiation (Optical Microscopy (D-E, 40×, bright field mode, scale bar 20 μm) and SEM (D1-E1, 23000×, 15 kV, SEI detector, no tilt, scale bar 1 μm)). The optical microscopy pictures revealed increases in the degree of aggregation of the MWCNTs and the formation of pores in the film from gas development. The SEM pictures show details of the pores formed after irradiation.

In summary, a sensing scheme can be deployed for the detection of uncharged ionization radiation. Functional POSs were accessed via click-chemistry methods, and several strategies were successfully deployed for the high sensor sensitivity. Systematic improvements in sensitivity can be accomplished by rational design, and incorporation of the appropriate chemical components in a sensing scheme.

Example 13

The following example discusses various aspects of high resolution spectroscopy of gamma rays.

High-resolution spectroscopic analysis of incident gamma rays involves differentiation and identification of the energies of the incoming gamma rays. At an atomic level, ionization by interaction with gamma rays in materials occurs mainly via three different phenomena: photoelectric absorption, Compton scattering, and pair production. In photoelectric absorption, an atom absorbs the gamma ray, and emits an electron, usually from its K-shell. The atom, which is left in an excited state, can relax back to the ground state typically by emitting Auger electrons or x-rays. Photoelectric absorption dominates in the range of gamma ray energies up to several hundred keV. By the Compton Effect, a photon is inelastically scattered by an atomic electron, and part of its energy is transmitted to the struck electron, leaving it in an unbound state. The Compton effect dominates for medium-energy gamma rays. Finally, during pair production, the photon is transformed into an electron and a positron in the electric field of the nucleus. The electron formed in this process has high energy, and produces bremsstrahlung and ionization on its path, while the positron is annihilated producing new photons. Pair production is the ionization event that dominates when high-energy gamma-rays are used (5-10 MeV). The probability of any of these interactions occurring for a specific gamma ray energy is the cross-section value for ionization from gamma-ray interaction for that energy.

Figure 13:
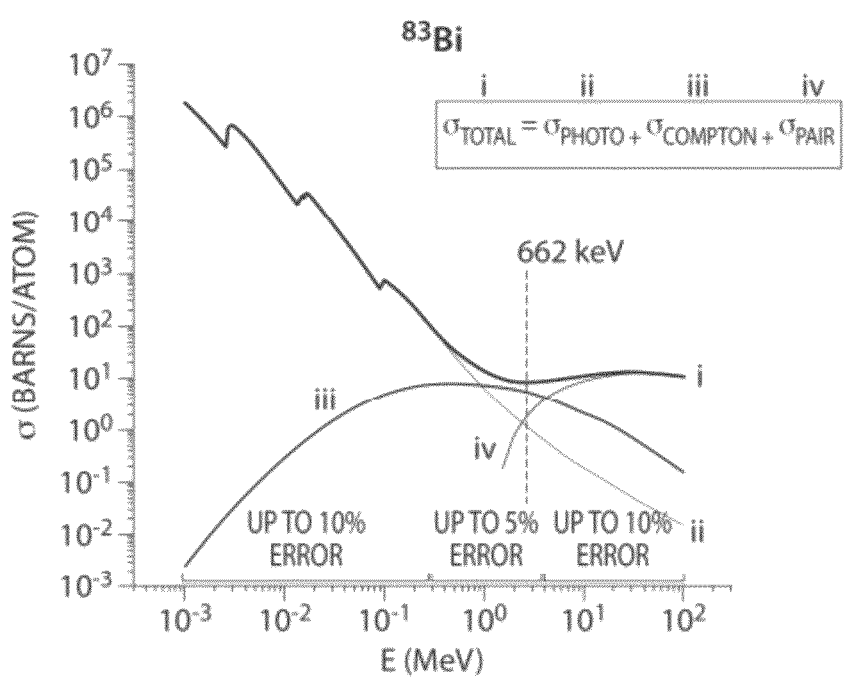
FIG. 13 shows a graph of the different components of the total cross-section of bismuth for gamma-ray interaction.

In FIG. 13, the different cross-sections for gamma-ray interaction for bismuth are shown. At a certain energy, the cross-section value will have at least two components: the component for photoelectric absorption of the photon, the component for Compton scattering, and a third component for pair production beyond 1.02 MeV, which is the minimum energy required to form an electron/positron pair. The cross-sections for every element at certain gamma-ray energies will change with the nature of the element, and the energy of the incident gamma ray. The total cross section curve for an element at different values of gamma ray energies will have a different shape, since the different components of the total cross section value are related to the nature of the element with different proportionalities.

Figure 14:
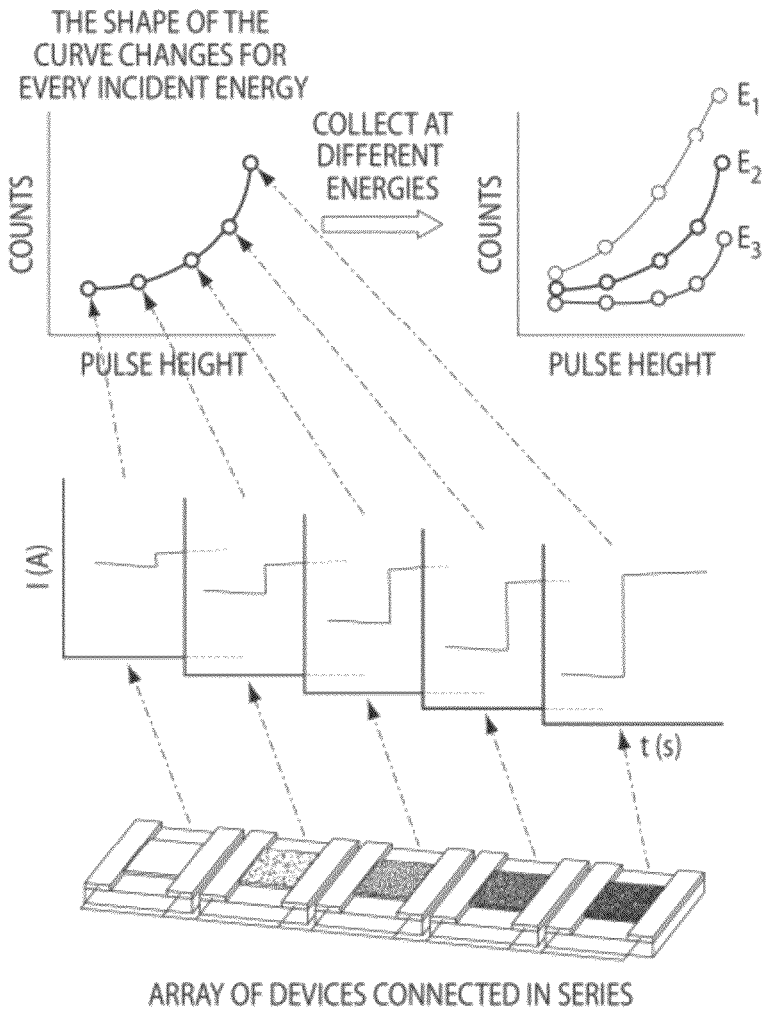
FIG. 14 shows a schematic illustration of an array device and differential responses to different energy ionization radiation.

In some embodiments described herein, the electrons produced upon interaction of the gamma-ray with the polymer matrix can depolymerize the matrix, and the extent to which this phenomenon will take place may be directly comparable to the amount of electrons generated upon ionization. Without wishing to be bound by theory, this number of electrons typically depends on the amount of high-Z doping elements incorporated in the matrix, and the chemical nature of the elements, since different elements have different cross-sections at different energies. High-resolution spectroscopic analysis could potentially be achieved by connecting several devices with varying high-Z elements (complexes or nanostructures containing Bi, Pb, Tl, Hg . . . ) as shown in FIG. 14.

For a given device containing a high Z doping element in a certain ratio, a proportional amount of electrons may be generated after interaction with gamma rays, and a certain variation in the amperometric signal (step increase in the current under a certain voltage) may be generated. This is the "pulse height" of this device, and the number of times this device gives this pulse height is its "count" number. Every device with a different amount of doping element or different doping element may give a different pulse height, and a different count number. As shown in FIG. 14, the combination of the pulse heights/counts for the whole series of devices may give a characteristic spectrum for every incident gamma ray energy.

Calibration with monochromatic gamma-ray sources may help establish the relationship between the shape of the curve pulse height/counts and the energy of the incident gamma-ray. After this relationship has been studied, these arrays of devices may be used for high-resolution spectroscopic analysis and identification of the unknown energy of an incident gamma ray or the energy components of a polychromatic incident set of gamma rays.

Example 14

The following example discusses various aspects of neutron sensing. The cross section for neutron interaction with materials may depend on the energy of the incident neutrons. For this reason, when considering neutron sensing, neutrons are typically classified depending on their energy: "slow neutrons" are those neutrons that have energies under 0.5 eV, while "fast neutrons" have energies above that range. Devices and methods described herein may be useful in the determination of both slow and fast neutrons.

Figure 15:
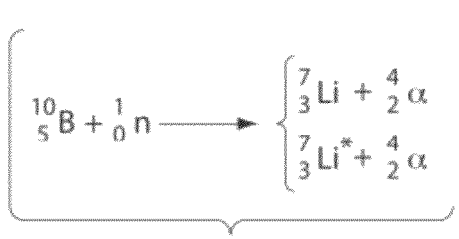
FIG. 15 shows the $^{10}B(n, \alpha)$ reaction.

"Slow neutron" Detection: One of the most used reactions for neutron sensing is the $^{10}B(n, \alpha)$ reaction, shown in FIG. 15, in which high energy α particles are generated. These α particles are highly ionizing along their trajectory. Upon interaction with the polymer material (e.g., POS) in the devices described herein, ionization and depolymerization may occur, leading to a sensing event.

Figure 16:
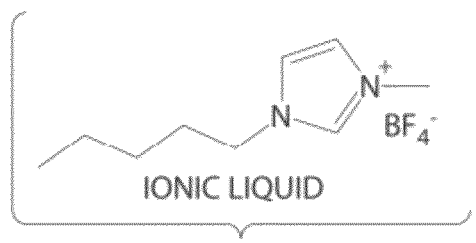
FIG. 16 shows an example of an ionic liquid.

Boron can be incorporated in the devices by swelling of the active film with an ionic liquid containing boron. An example of an ionic liquid suitable for this purpose is 1-butyl-3-methylimidazolium tetrafluoroborate. (FIG. 16) This liquid incorporates tetrafluoroborate, $BF_4^-$, very similar to the motif $BF_3$, which is commonly used in thermal neutron gas detectors.

An alternative for doping for neutron sensing would be the less commonly used Gadolinium (Gd) metal complexes. $^{157}Gd$ has the largest cross section for neutron absorption after $^{135}Xe$. Systems doped with Gd could potentially lead to higher sensitivities. In an illustrative embodiment, Gd metal complexes comprising a single or plurality of triple bond moieties may be incorporated into polymer materials via the click reaction.

Figure 17:
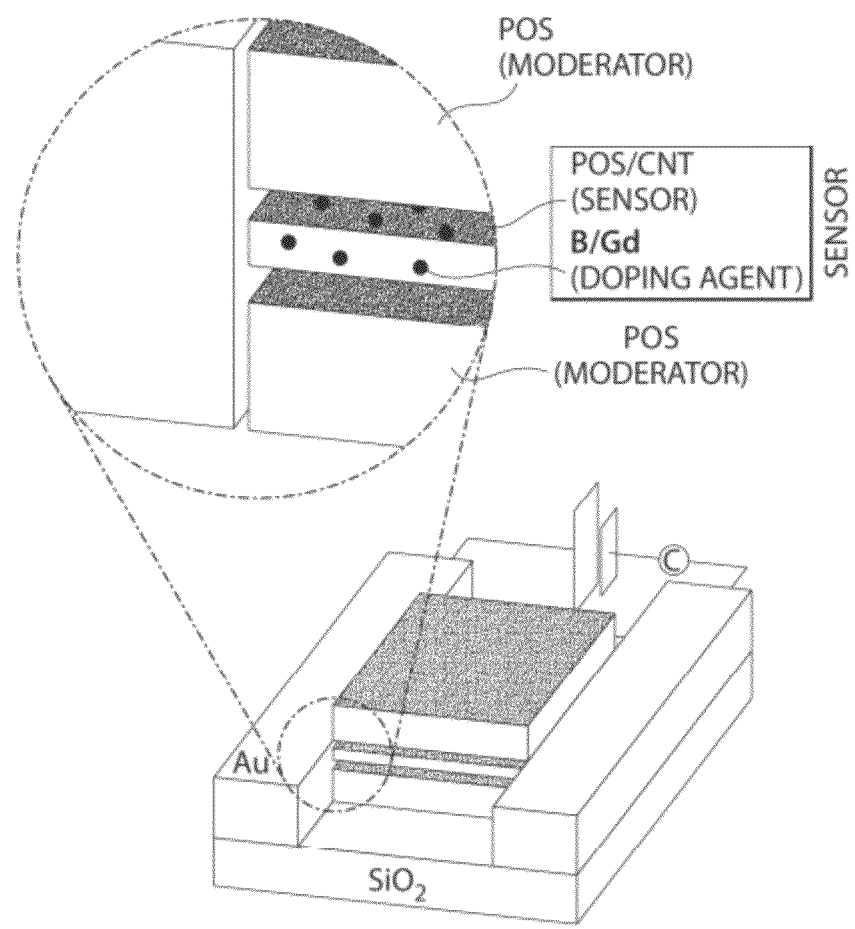
FIG. 17 illustrates a schematic representation of a device for neutron detection.

"Fast neutron" Detection: The cross section for neutron interaction with most materials decreases as the energy of the incident neutrons increases. A typical strategy in "fast neutron" detection is the use of moderators as materials that reduce the energy of the incident neutrons, so that, by the time they reach the detector, their energies are within the range of detection of the "slow neutron" detector. Materials commonly used as moderators are materials with a high content in hydrogen atoms, like paraffin or polyethylene (PE). Polymer materials described herein may be used as a moderator, since they also have a high content in hydrogen atoms. As shown in FIG. 17, a device may include two moderator layers on either side of a sensor material. In some cases, the top moderator layer may be a porous POS that would not only act as a moderator, but could also allow for gas release upon POS degradation by ionizing radiation.

Example 15

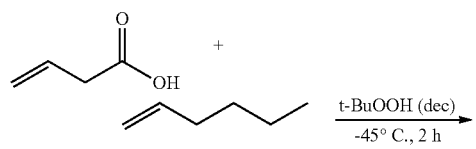

-continued

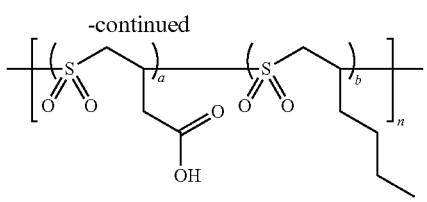

A polymer for a sensor material of the present invention was synthesized according to the scheme described above, wherein a is 1, b is 3, and n is 40. The polymer was then reacted with $GdCl_3$ is pyridine at 70° C. for about 2.5 hours to obtain a composition having the structure:

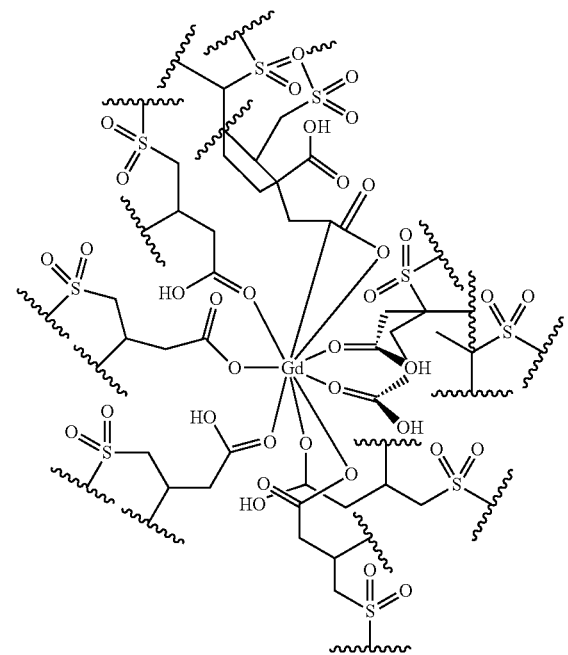

wherein the composition may be used in a device or method as described herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A device for determining ionizing radiation, comprising:
a sensor material comprising a plurality of nanostructures positioned relative to each other so as to together define an average distance between adjacent nanostructures and a polymer material integrally connected to at least a portion of the plurality of nanostructures; and
a first and a second electrode in electrochemical communication with the sensor material,
wherein at least a portion of the polymer material undergoes depolymerization upon exposure of the device to ionizing radiation such that the average distance between adjacent nanostructures is altered, thereby affecting current flow between the first and second electrode, the change in current flow being indicative of ionizing radiation.

2. A device as in claim 1, wherein the polymer material comprises a poly(olefin sulfone), optionally substituted.

3. A device as in claim 1, wherein the polymer material comprises a polyaldehyde, optionally substituted.

4. A device as in claim 1, wherein the sensor material further comprises a species that interacts with the nanostructures via pi-pi stacking interactions.

5. A device as in claim 1, wherein the sensor material comprises polycyclic aromatic hydrocarbons.

6. A device as claim 1, wherein the sensor material comprises pyrene groups.

7. A device as in claim 1, wherein the sensor material comprises a group that increases the cross-section value of the sensor material for interaction with ionizing radiation.

8. A device as in claim 1, wherein the sensor material comprises a metal-containing group.

9. A device as in claim 8, wherein the metal-containing group is a metal complex or a metal nanoparticle.

10. A device as in claim 8, wherein the metal-containing group comprises a heavy metal.

11. A device as in claim 8, wherein the metal-containing group comprises bismuth.

12. A device as in claim 8, wherein the metal-containing group comprises gadolinium.

13. A device as in claim 1, wherein the sensor material comprises a plurality of metal-containing groups, each group having a different cross-section value for interaction with ionizing radiation.

14. A device as in claim 1, wherein the sensor material comprises a polymer having the structure,

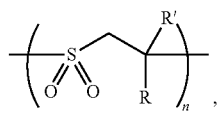

wherein:
R and R' can be the same or different and are alkyl, heteroalkyl, alkenyl, heteroalkenyl, alkynyl, heteroalkynyl, aryl, heteroaryl, any of which may be substituted; and
n is 1 or greater.

15. A device as in claim 14, wherein n is 10 or greater.

16. A device as in claim 14, wherein R is alkyl, optionally substituted with an azide group or a polycyclic aromatic hydrocarbon.

17. A device as in claim 1, wherein the sensor material comprises a polymer having the structure,

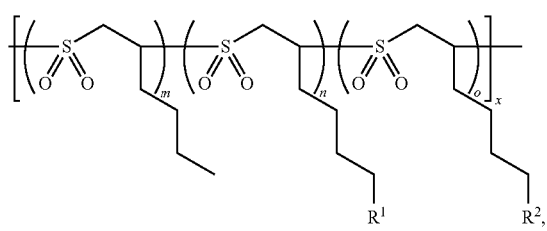

wherein:

R¹ and R² can be the same or different and are alkyl, heteroalkyl, alkenyl, heteroalkenyl, alkynyl, heteroalkynyl, aryl, heteroaryl, any of which may be substituted;

m, n, and can be 0 or greater, provided that at least one of m, n, and o is 1 or greater; and x is 1 or greater.

18. A device as in claim 17, wherein x is 3 or greater.

19. A device as in claim 1, wherein the sensor material comprises a polymer having the structure,

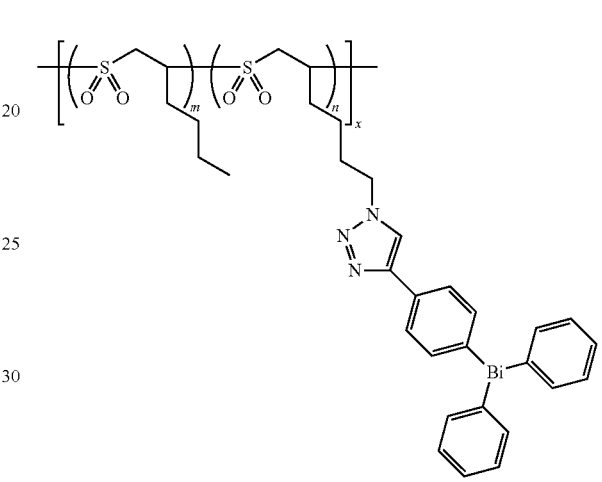

wherein R and R' can be the same or different and are alkyl, heteroalkyl, alkenyl, heteroalkenyl, alkynyl, heteroalkynyl, aryl, heteroaryl, any of which may be substituted; a, b, c, and d are 0 or greater; and m and n can be 0 or greater, provided that at least one of m and n is 1 or greater; and x is 1 or greater.

20. A device as in claim 1, wherein the sensor material comprises a polymer having the structure, 21. A device as in claim 1, wherein the sensor material comprises a polymer having the structure,

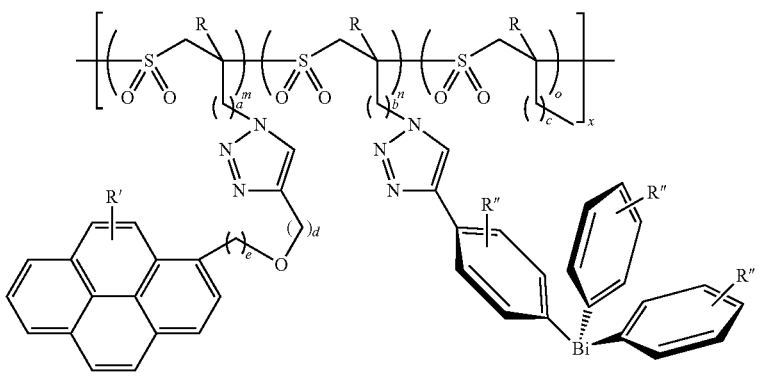

wherein R, R', and R" can be the same or different and can be alkyl, heteroalkyl, alkenyl, heteroalkenyl, alkynyl, heteroalkynyl, aryl, heteroaryl, any of which may be substituted; a, b, c, d, and e are 0 or greater; and m, n, and o can be 0 or greater, provided that at least one of m, n, and o is 1 or greater; and x is 1 or greater.

22. A device as in claim 1, wherein the sensor material comprises a mixture of polymers.

23. A device as in claim 1, wherein the nanostructures are nanotubes, nanorods, nanoribbons, nanowires, or nanoparticles.

24. A device as in claim 1, wherein the nanostructures are single-walled carbon nanotubes or multi-walled carbon nanotubes.

25. A device as in claim 1, wherein the nanostructures are gold, silver, copper, bismuth, or gadolinium nanowires.

26. A system, comprising a plurality of devices as described in claim 1.

27. A device as in claim 1, wherein the sensor material comprises a polymer having the structure,

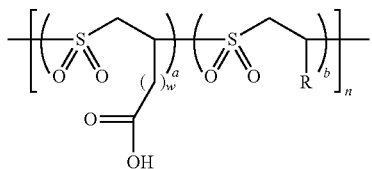

wherein a, b, w, and n are each individually 0 or greater, R is alkyl, aryl, heteroalkyl, heteroaryl, each optionally substituted.

28. A device as in claim 1, wherein the sensor material comprises a polymer having the structure,

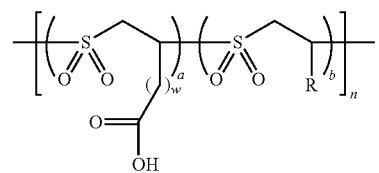

wherein a, b, w, and n are each individually 0 or greater, R is alkyl, aryl, heteroalkyl, heteroaryl, each optionally substituted.

29. A device as in claim 14, wherein R is alkyl, optionally substituted with COOR', wherein R' is H, alkyl, aryl, heteroalkyl, heteroaryl, or a metal-containing species.

30. A device as in claim 29, wherein R' is gadolinium.

31. A device as in claim 27, wherein a, b, and w are each individually 0 or greater and n is 1 or greater.

32. A device as in claim 28, wherein a, b, and w are each individually 0 or greater and n is 1 or greater.

* * * * *